US012382289B2

(12) United States Patent
Kolych et al.

(10) Patent No.: US 12,382,289 B2
(45) Date of Patent: Aug. 5, 2025

(54) ADDITIONAL SECURITY RANGING FOR BLE USING CO-LOCATED WI-FI DEVICES

(71) Applicant: Cypress Semiconductor Corporation, San Jose, CA (US)

(72) Inventors: Igor Kolych, Lviv (UA); Kiran Uln, Pleasanton, CA (US); Claudio Rey, Chandler, AZ (US)

(73) Assignee: Cypress Semiconductor Corporation, San Jose, CA (US)

( * ) Notice: Subject to any disclaimer, the term of this patent is extended or adjusted under 35 U.S.C. 154(b) by 221 days.

(21) Appl. No.: 18/158,285

(22) Filed: Jan. 23, 2023

(65) Prior Publication Data

US 2024/0251247 A1 Jul. 25, 2024

(51) Int. Cl.
*H04W 12/121* (2021.01)
*H04B 17/336* (2015.01)
*H04W 24/10* (2009.01)

(52) U.S. Cl.
CPC ........ *H04W 12/121* (2021.01); *H04B 17/336* (2015.01); *H04W 24/10* (2013.01)

(58) Field of Classification Search
CPC ... H04W 12/12; H04W 12/121; H04W 12/30; H04W 12/40; H04W 12/50; H04W 24/10; H04B 17/336
See application file for complete search history.

(56) References Cited

U.S. PATENT DOCUMENTS

| | | | | |
|---|---|---|---|---|
| 8,035,515 B2 * | 10/2011 | Jang | ........................ | G01S 17/88 340/567 |
| 8,126,030 B2 * | 2/2012 | Klomsdorf | ........... | H04B 1/1027 375/220 |
| 9,577,773 B2 * | 2/2017 | Solondz | .................. | H04L 43/50 |
| 9,608,678 B1 * | 3/2017 | Sun | ........................ | H04W 16/14 |
| 10,484,114 B1 * | 11/2019 | Nijim | .................... | H04B 17/318 |
| 10,849,006 B1 * | 11/2020 | Beg | ........................ | G08B 13/187 |
| 11,277,739 B2 * | 3/2022 | Min | ........................ | H04L 5/0048 |
| 11,343,004 B1 * | 5/2022 | Nijim | .................... | G06T 11/206 |
| 11,743,283 B2 * | 8/2023 | Motos | ................. | H04L 63/1466 726/25 |
| 11,902,819 B2 * | 2/2024 | Beg | ........................ | H04W 24/10 |
| 11,916,591 B2 * | 2/2024 | Almadi | .............. | H04B 10/1123 |
| 12,038,493 B2 * | 7/2024 | Beg | ........................ | H04W 84/18 |

* cited by examiner

*Primary Examiner* — Hosuk Song

(57) ABSTRACT

Techniques are disclosed to leverage co-located radios such as BLE and Wi-Fi radios to increase the security of BLE ranging and localization. In one aspect, a transmitting BLE device may use a co-located Wi-Fi radio to transmit signals to interfere with an intruding device's interception of BLE RTT packets. The obfuscating Wi-Fi transmission may overlap a BLE RTT packet in the time domain with or without overlapping in the frequency domain. In one aspect, the co-located Wi-Fi radio may transmit pre-determined signature Wi-Fi signals concurrently with the BLE RTT packets to a receiver with co-located BLE and Wi-Fi radios. The receiver may detect a change in the pre-determined relationship between the two types of communication to reveal an intrusion attempt. In one aspect, a co-located Wi-Fi radio may capture parts of BLE RTT packets concurrently with a BLE radio transmitting or receiving BLE RTT packets to detect an intrusion attempt.

20 Claims, 17 Drawing Sheets

ADDITIONAL SECURITY RANGING FOR BLE USING CO-LOCATED WI-FI DEVICES

TECHNICAL FIELD

The subject matter relates to the field of wireless connectivity solutions. More specifically, but not by way of limitation, the subject matter discloses techniques for positioning and ranging using wireless signals, and more particularly, to techniques for improving the security of ranging solutions using narrow-band radios such as Bluetooth technologies.

BACKGROUND

Ranging and localization applications such as secured entry, indoor positioning, asset tracking, etc., are increasingly relying on the use of narrow-band radios for personal area networks (PANs) such as Bluetooth (BT), Bluetooth Low Energy (BLE), IEEE 802.15.4, Zigbee, Thread, etc., to provide sub-meter accuracy and secure distance measurements. For example, smart tags, smart phones, smart devices, Internet-of-Things (IoT) that use short-range BLE technologies for wireless communication may use BLE radios to perform ranging and positioning of other devices.

In secured entry applications providing secure keyless entry to locked enclosures (e.g., a residence, a vehicle, a garage) or other secure resources, a person in possession of a keyless entry device such as a smartphone may exchange BLE packets with a device controlling access to the locked enclosures for the two devices to estimate their mutual distances based on round trip timing (RTT) of the packets. For example, a keyless entry device may transmit a data pattern within a frame delimiter of a BLE packet, also known as a BLE channel sounding (BLE CS) synchronization pattern, to a device in a vehicle. The device in the vehicle may perform frame synchronization detection to verify that the received data pattern matches an expected CS synchronization pattern to provide a level of security for keyless entry based on distance ranging. The device in the vehicle may then unlock the door of the vehicle when the keyless entry device is estimated to be in close proximity to the vehicle. However, the distance ranging application is vulnerable to man-in-the-middle (MITM) or other spoofing attacks. An intruder seeking access to the vehicle may intercept the BLE packet transmitted by the keyless entry device. The intruder may then manipulate the timing of the BLE packets for transmission to appear in close proximity to the vehicle when the intruder (and the keyless entry device) are actually far away. It is desired to improve the security of keyless entry solutions against MITM attacks.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
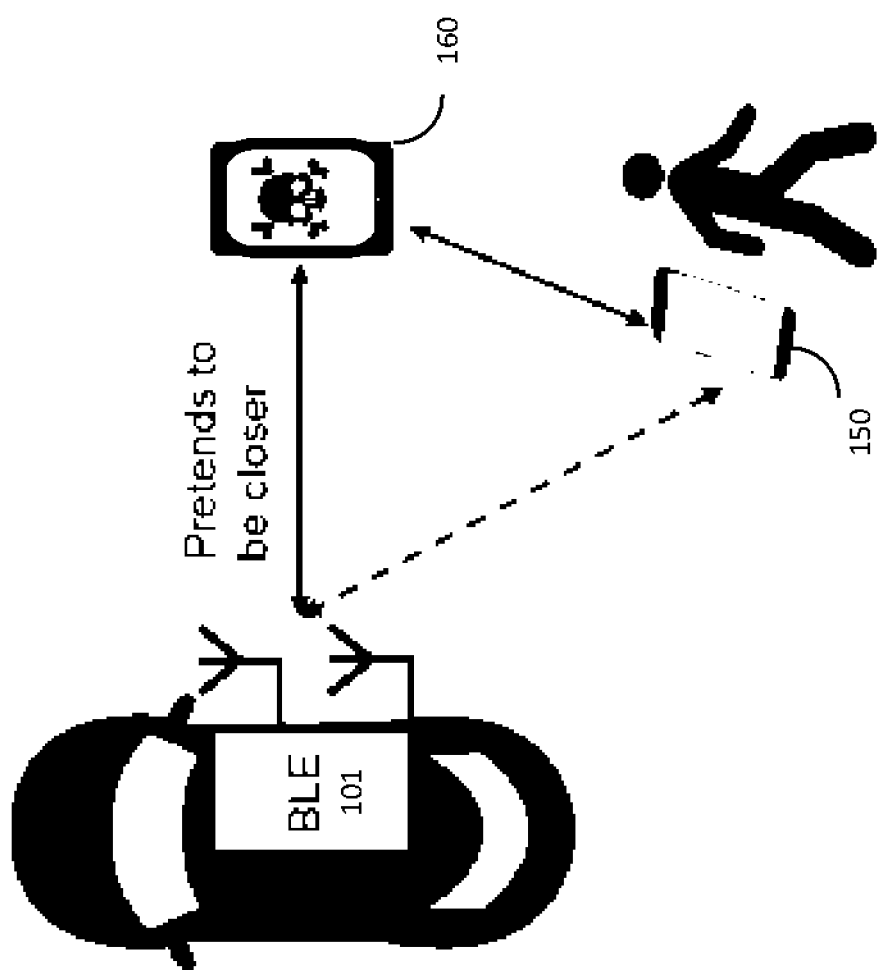
FIG. 1 illustrates a scenario of an intruding device launching a MITM attack by intercepting and manipulating the BLE packet transmitted by a keyless entry device to make the intruding device appear closer to a vehicle to gain access to the vehicle, in accordance with one aspect of the present disclosure.

Examples of various aspects and variations of the subject technology are described herein and illustrated in the accompanying drawings. The following description is not intended to limit the invention to these embodiments, but rather to enable a person skilled in the art to make and use this invention. For example, while aspects of the disclosure are explained using Blue Low Energy (BLE) networks, the disclosed techniques are equally applicable to other types of wireless communication technologies.

Described are systems and methods for improving the security of ranging and localization solutions between wireless devices used in high accuracy positioning (HAP) applications using BLE, IEEE 802.15.4, or other short-range narrow-band radio technologies employed by personal area networks (PANs). Some implementations of the HAP applications may use frame synchronization detections for distance measurements between devices. For example, in HAP applications, some packets may include a frame delimiter (or SFD) without a payload (e.g., frame synchronization packets), particularly where the frame delimiter itself is initially employed for security purposes, e.g., in order to perform verification of a wireless device transmitting the frame synchronization packets. The data of a packet described herein may refer to just a frame delimiter, also called a frame synchronization pattern, or may refer to the payload of data within the packet.

In some PAN devices, frame synchronization can be used as part of BLE distance estimation techniques, which was also previously known as BLE high accuracy distance measurement (HADM). BLE distance estimation may also be achieved through a phase-based distance ranging method, or through packet exchanges in round trip timing (RTT) estimation, or a combination thereof to provide localization between wireless devices. In one example, BLE frame synchronization patterns, also known as BLE channel sounding (BLE CS) synchronization patterns, are used in RTT estimation to estimate the time of arrival (ToA) of a packet. In this case, distance is estimated from traveling time between an initiator to a reflector and back where the initiator is the device that initiates the packet exchange and the reflector is the device that responds to the packet exchange. So, a RTT packet is send first time from the initiator to the reflector and then the reflector sends a different RTT packet back to the initiator. In another example, BLE distance estimation techniques may use the frequency estimated during the RTT estimation to synchronize multiple BLE distance estimation devices through the correction of clocking errors and to estimate the phase during the phase ranging.

RTT-based ranging techniques employed for security can be spoofed and is thus susceptible to attacks. For example, RTT-based ranging can be spoofed by an attacker (such as a man-in-the middle (MITM)) using a methods known as early detect late commit (EDLC) or early commit late detect (ECLD). An attacker may attempt to gain access to an enclosure or a resource secured by a BLE device such as a car in the driveway. The attacker knows that there is a key inside the house and that the car is in scan mode and can see the key inside but given its distance to the car the car door will not unlock. The attacker's device may act as a relay that intercepts and manipulates both the ranging signals from the car to the key and the ranging signals from the key to the car to gain access to the car.

FIG. 1 illustrates a scenario of an intruding device 160 launching a MITM attack by intercepting and manipulating the BLE packet transmitted by a keyless entry device 150 (referred simply as key) to make the intruding device 160 appear closer to a vehicle to gain access to the vehicle, in accordance with one aspect of the present disclosure. For example, the intruding device 160 may manipulate and relay signals from the key 150 and from the BLE transceiver 101 of the car to make both signals appear stronger and earlier. In an ECLD attack, the intruding device 160 may guess each symbol of the BLE frame synchronization pattern bits transmitted from the key 150 and may transmit the guessed symbols to the car before the symbols from the key 150 are intercepted by the intruding device 160. As the intruding device 160 intercepts each symbol from the key 150, the intruding device 160 determines if a guessed symbol being transmitted is incorrect. If it is incorrect, the intruding device 160 quickly corrects the transmitted symbol in time for the car's BLE transceiver 101 to perform frame synchronization detection using the symbol. In RTT-based ranging, a BLE receiver performs frame synchronization detection by correlating received data with the expected frame synchronization pattern. Frame synchronization may be declared as detected when a correlation peak crosses a detection threshold. The car's BLE transceiver 101 may detect frame synchronization despite the manipulation of the symbols of the frame synchronization pattern.

Because the BLE transceiver 101 perceives the intruding device 160 as appearing closer than the key 150 due to the earlier reception of the frame synchronization pattern, the BLE transceiver 101 may be spoofed into granting the attacker access to the car. Ways to mitigate the attack may include techniques such as transmitting the RTT packet with a companion signal in an adjacent frequency to obfuscate the packet, performing a more accurate correlation of the received data with the frame synchronization pattern to detect the RTT packet timing, estimating an angle of arrival (AoA) of the RTT packet, etc. While the techniques may be implemented on the BLE transceiver of a car to increase security, they may be difficult to implement on a key such as a phone. In addition, some of the techniques may still be insufficient for high security applications. To remedy the security vulnerabilities associated with manipulations of the frame synchronization pattern or other RTT-based ranging packets by MITM attackers, techniques are disclosed to degrade the ability of an intruding device to launch an attack or to improve the ability of a receiving device to detect an attack.

Described herein are various techniques to leverage co-located radios such as BLE and Wi-Fi radios usually found in a wireless device to increase the security of ranging and localization solutions found in BLE HADM applications. In one aspect, a transmitting BLE device may use a co-located Wi-Fi radio to transmit signals to interfere with an intruding device's interception and manipulation of BLE RTT packets. The obfuscating Wi-Fi transmission may overlap a BLE RTT packet in the time domain with or without also overlapping in the frequency domain to make it more difficult for the intruding device to detect the BLE RTT packet or its symbols. For example, transmitting a high power Wi-Fi packet or a preamble concurrently with the BLE RTT packet in non-overlapping channels may force the intruding device to be narrow band to avoid interference, thus increasing the complexity and cost of the intruding device. In another example, transmitting an obfuscating Wi-Fi signal that overlaps in both time and frequency domains with the BLE RTT packet may make it more difficult for the intruding device to detect early the symbols of the BLE frame synchronization pattern in an ECLD attack, especially in a noisy environment.

In one aspect, a transmitting BLE device may use a co-located Wi-Fi radio to transmit Wi-Fi signals concurrently with the BLE RTT packets to a receiver with co-located BLE and Wi-Fi radios. The Wi-Fi transmission may have a pre-determined power ratio, temporal relationship, spectral relationship, channel location, or other signal metrics with respect to the BLE RTT packet. The Wi-Fi transmission may act as a signature packet or a signature preamble known to a receiver for the receiver to detect a change in the pre-determined relationship between the two types of communication to reveal an intrusion attempt. As a result, the intruding device is forced to manipulate both transmissions to launch a successful attack, thus again increasing its complexity and cost.

In one aspect, a co-located Wi-Fi radio may capture parts of the BLE RTT packet, that is, a set of symbols that are used for ranging. In other embodiments, Wi-Fi radio may capture constant tone signals transmitted over different carrier frequencies and whose phases are measured for ranging purpose. The Wi-Fi radio may have a wider receiving bandwidth than that of the BLE radio. The Wi-Fi radio's wider receiving bandwidth combined with its higher sampling rate may afford better spectral resolution to detect anomalies or distortions in the signals of the BLE RTT packet caused by manipulations by an intruding device. In one aspect, the capturing Wi-Fi radio may provide antenna spatial diversity for an independent observation of the BLE ranging signals. In one aspect, the signals captured by the Wi-Fi radio and the BLE radio may provide angle of arrival (AoA) capability of the BLE ranging signals to improve the ability to detect an intruding signal. In one aspect, a Wi-Fi radio co-located with the transmitting BLE radio may capture manipulated BLE signals transmitted by an intruding device while the BLE radio is transmitting BLE RTT packets. The Wi-Fi and BLE antennas may be spatially decoupled by having different directionalities or may have different antenna polarizations to improve the ability to detect intruding signals.

Advantageously, the disclosed techniques to thwart or detect manipulated BLE transmissions by an intruding device using a co-located Wi-Fi radio may be practiced with small changes to existing hardware resources or software solutions. The techniques may be complementary to existing BLE security approaches and may be flexibly performed on a device transmitting BLE ranging signals, a receiving device, or both transmitting and receiving devices with co-located Wi-Fi radios.

Figure 2:
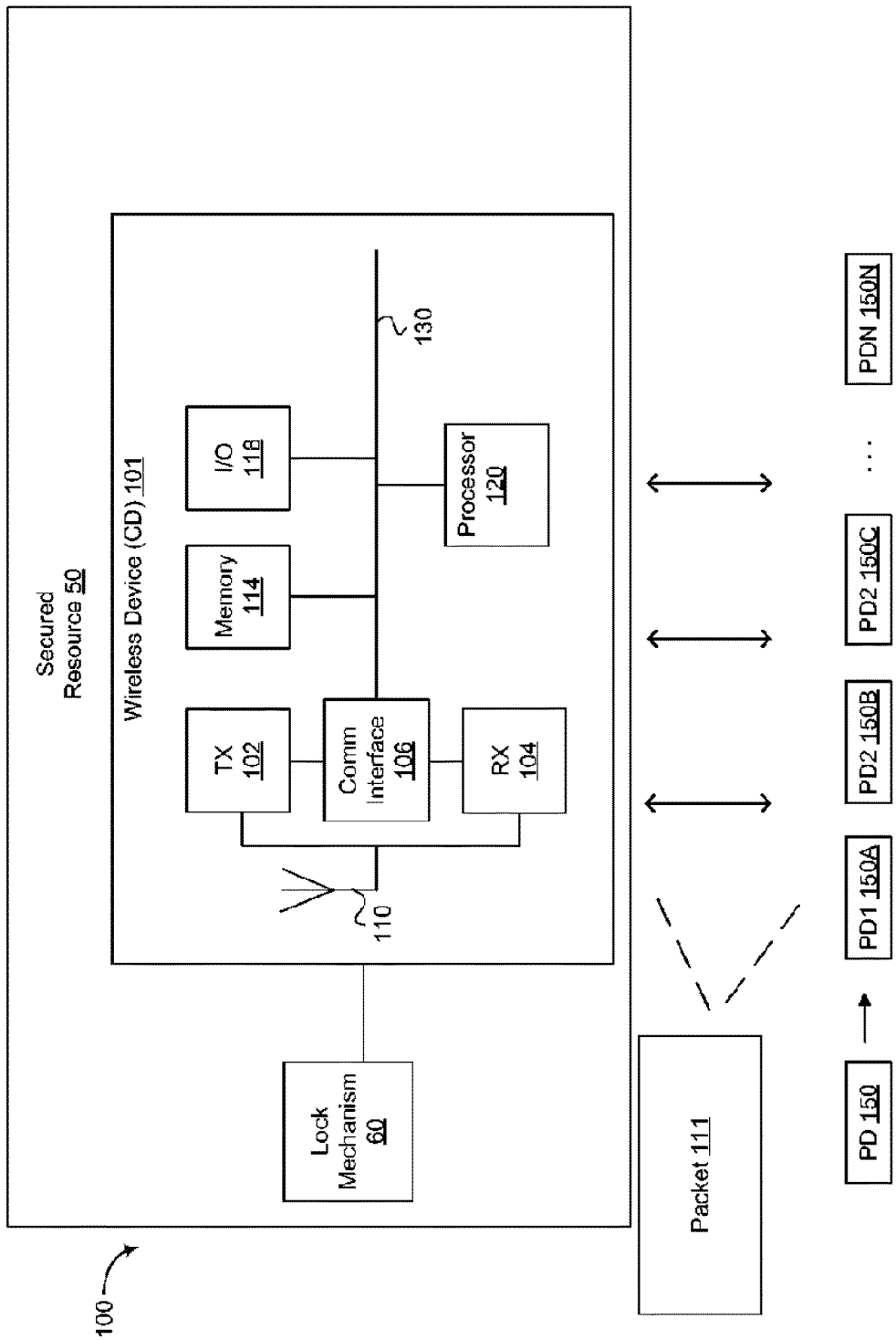
FIG. 2 illustrates a block diagram of a localization system used for BLE frame synchronization detection to control access to a secured resource, in accordance with one aspect of the present disclosure.

FIG. 2 illustrates a block diagram of a localization system used for BLE frame synchronization detection to control access to a secured resource, in accordance with one aspect of the present disclosure. In this embodiment, a wireless device 101 acts as a central device (CD) of the BLE network and may be referred to herein as a receiving device. Further, a wireless device 150 acts as a peripheral device (PD) of the BLE network and may be referred to herein as a transmission device. The system 100 may include a secured resource 50, e.g., that is secured using a lock mechanism 60, where the peripheral wireless device 150 is adapted to gain access to the secured resource 50 via the lock mechanism 60. The secured resource 50 may be, for example, an enclosure such as a vehicle, a building, a residence, a garage, a shed, a vault, or the like. The secured resource 50 may also be a computer system, industrial equipment, or other items requiring secured access via the lock mechanism 60, which can be, for example, a digital locking mechanism. In some embodiments, the lock mechanism 60 may be integrated together with the central wireless device 101.

In some embodiments, the peripheral wireless device 150 is any one of multiple peripheral wireless devices PD1 150A . . . PDN 150N, as the central wireless device 101 may be adapted to communicate with any or all of the peripheral wireless devices PD1 150A . . . PDN 150N. In some embodiments, the peripheral wireless device 150 is a mobile device such as a mobile phone, a smart phone, a pager, an electronic transceiver, a tablet, a keyless entry device, or the like. In these embodiments, the peripheral wireless device 150 may be adapted to gain access to the secured resource 50 by transmitting data including a frame synchronization pattern (e.g., BLE channel sounding (BLE CS) synchronization pattern) encapsulated in a frame synchronization packet 111. While the central wireless device 101 is illustrated in detail, the peripheral wireless device 150 may also include the same or similar components as the central wireless device 101, the descriptions of which are not repeated for brevity.

In some embodiments, the central wireless device 101 includes, but is not be limited to, a transmitter or TX 102 (e.g., a PAN transmitter), a receiver or RX 104 (e.g., a PAN receiver), a communications interface 106, one or more antennas 110, a memory 114, one or more input/output (I/O) devices 118 (such as a display screen, a touch screen, a keypad, and the like), and a processor 120. These components may all be coupled to a communications bus 130. TX 102 and RX 104 may be collectively referred to as a transceiver.

In some embodiments, a separate antenna is employed for each of the transmitter 102 and receiver 104, and so the antenna 110 is illustrated for simplicity. In some embodiments, the memory 114 may include storage to store instructions executable by the processor 120 and/or data generated by the communication interface 106. In some embodiments, front-end components such as the transmitter 102, the receiver 104, the communication interface 106, and the one or more antennas 110 described herein may be adapted with or configured for PAN-based frequency bands, e.g., Bluetooth® (BT), BLE, Wi-Fi®, Zigbee®, Z-Wave™, and the like.

In some embodiments, the communications interface 106 is integrated with the transmitter 102 and the receiver 104, e.g., as a front-end of the wireless device 101. The communication interface 106 may coordinate, as directed by the processor 120, to request/receive packets from the peripheral wireless device 150 or to transmit packets to the peripheral wireless device 150. The packets may include the frame synchronization packet 111 or other RTT-based ranging packets. The communications interface 106 may process data symbols received by the receiver 104 in a way that the processor 120 can perform further processing, including verifying correlation between phase-based samples of data values obtained from a frame synchronization packet 111 and an expected data pattern as part of a security protocol to detect the frame synchronization pattern. The communication interface 106 may analyze the frame synchronization pattern to detect a MITM attack or may estimate the distance to the peripheral wireless devices 150 based on the correlation value or other phase-based ranging methods. In some embodiments, the detection of a MITM attack may be performed by a different module, the processor 120, or by a separate device. The processor 120 may communicate with a co-located Wi-Fi transceiver through a wired or wireless interface (not shown) to command transmissions of Wi-Fi obfuscating or signature signals, or to receive information on the Wi-Fi signature signals or intrusion reports from the co-located Wi-Fi transceiver, as will be described.

Figure 3:
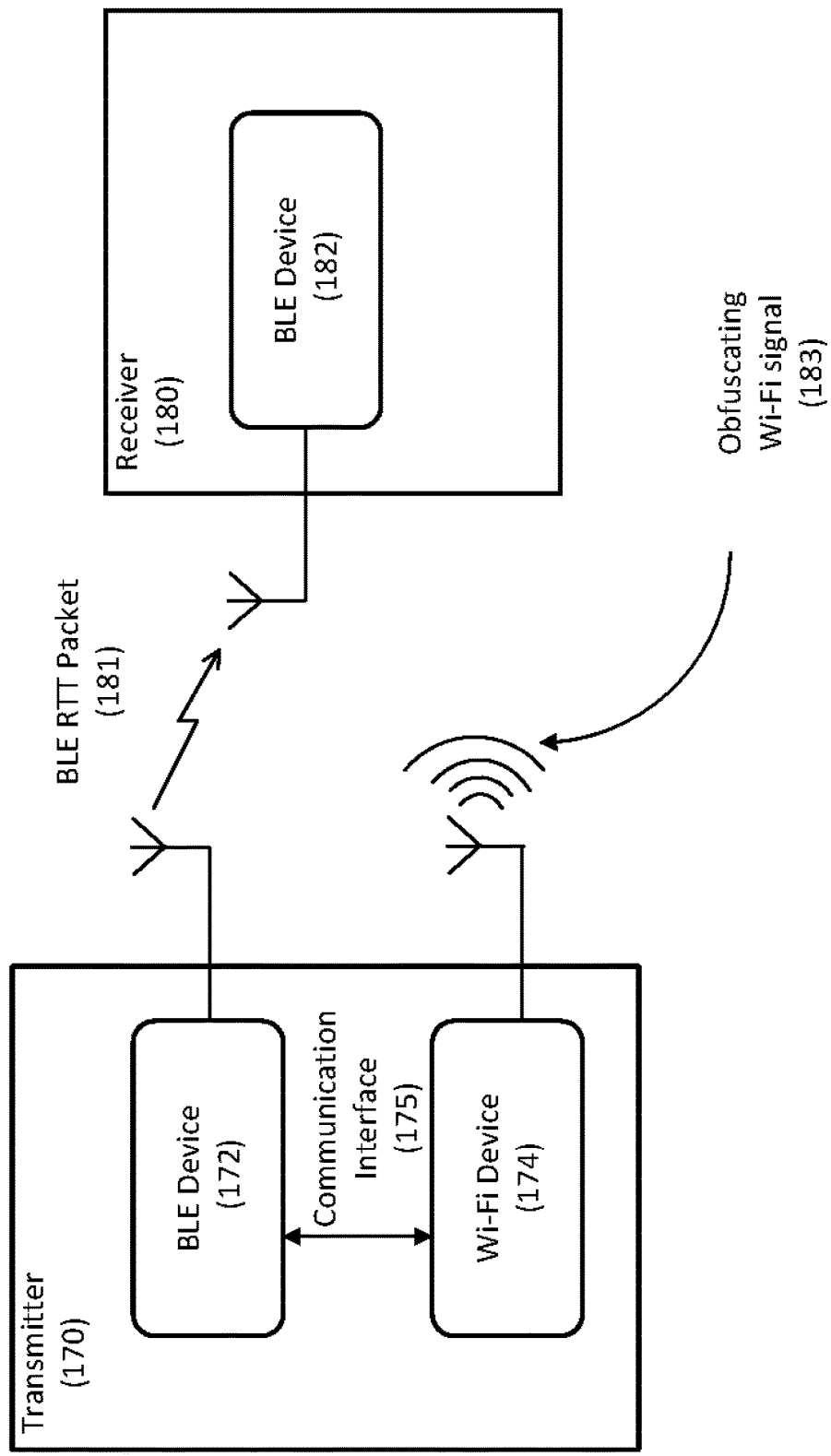
FIG. 3 illustrates a functional block diagram of a BLE device using a co-located Wi-Fi transceiver to transmit a signal to obfuscate the BLE RTT ranging packets transmitted by the BLE transceiver to degrade the ability of an intruding device to launch an attack, in accordance with one aspect of the present disclosure.

FIG. 3 illustrates a functional block diagram of a BLE device using a co-located Wi-Fi transceiver to transmit a signal to obfuscate the BLE RTT ranging packets transmitted by the BLE transceiver to degrade the ability of an intruding device to launch an attack, in accordance with one aspect of the present disclosure. The BLE RTT ranging packets may contain a frame synchronization pattern or may contain unmodulated pulses or constant tone signals over different carrier frequencies to mitigate multipath fading and interference. Transmitter 170 and receiver 180 may detect each other's frame synchronization patterns or may perform phase measurements on each other's constant tone signals. Transmitter 170 may be an initiator that initiates a packet exchange or a reflector that responds to the packet exchange. Receiver 180 may also be an initiator or a reflector. For example, transmitter 170 may send constant tone signals toward receiver 180. In response, receiver 180 may send back its own constant tone signals toward transmitter 170. At the end of the multiple tone exchanges, transmitter 170 and receiver 180 may exchange their phase measurement results to estimate the range between transmitter 170 and receiver 180. As an alternative, a reflector may synchronize to a tone of an initiator and return the tone signal with the received phase to allow the initiator to perform distance estimation based on multiple tones. In one embodiment, transmitter 170 or receiver 180 may be either the central wireless device 101 or the peripheral wireless device 150 of FIG. 2.

Transmitter 170 may contain a BLE device 172 and a co-located Wi-Fi device 174; Receiver 180 may contain a BLE device 182. The devices may also be referred to as radios or transceivers. BLE device 172 of transmitter 170 may transmit a BLE RTT packet 181 for BLE device 182 of receiver 180 to estimate the range between two devices. BLE device 172 may command the co-located Wi-Fi device 174 through a communication interface 175 to transmit an obfuscating Wi-Fi signal 183 that partially or totally overlaps in time with BLE RTT packet 181. Obfuscating Wi-Fi signal 183 may be a Wi-Fi packet or the preamble of a Wi-Fi packet transmitted with higher power than the transmitted power of BLE RTT packet 181. In one embodiment, obfuscating Wi-Fi signal 183 may overlap both in time and in frequency with BLE RTT packet 181. BLE device 182 of receiver 180 may correctly receive BLE RTT packet 181 despite the interference of obfuscating Wi-Fi signal 183. However, an intruding device that attempts to intercept and manipulate BLE RTT packet 181 to make the intruding device appear closer to receiver 180 may be degraded in its ability to detect early the symbol transitions of the frame synchronization pattern or the phase of constant tone signals in a noisy environment. While transmitter 170 is shown as using co-located Wi-Fi device 174 to transmit obfuscating Wi-Fi signal 183, receiver 180 that has a co-located Wi-Fi device may similarly transmit a Wi-Fi signal to obfuscate its BLE packet. The transmission of obfuscating Wi-Fi signals is therefore independent of the role of initiator and reflector in a ranging and localization system.

Figure 4:
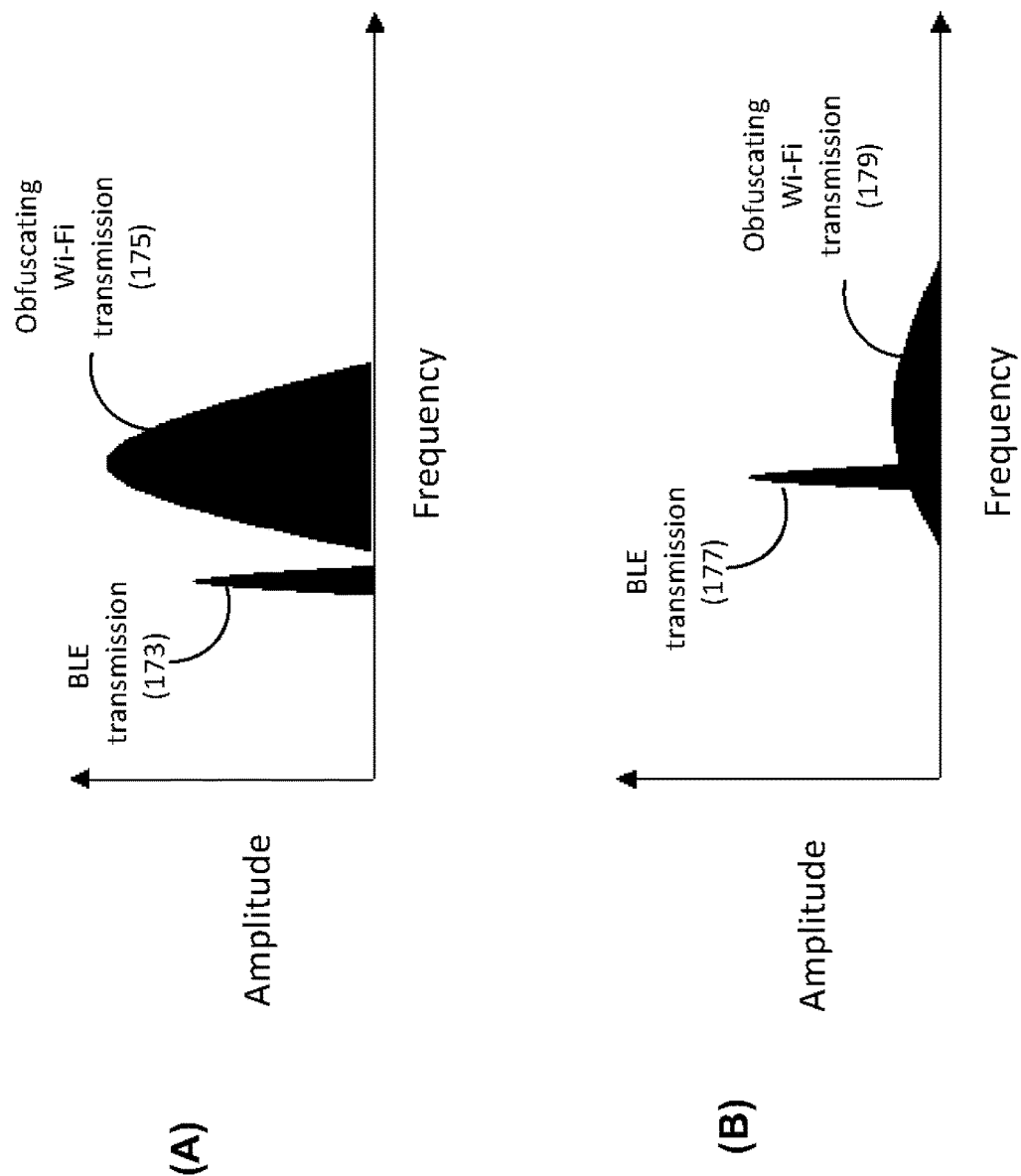
FIG. 4(A) illustrates a Wi-Fi obfuscating transmission that is non-overlapping in the frequency domain but is overlapping in the time domain with the BLE RTT packet for the purpose of intrusion avoidance, in accordance with one aspect of the present disclosure.
FIG. 4(B) illustrates a Wi-Fi obfuscating signal that is overlapping both in the frequency domain and in the time domain with the BLE RTT packet in an alternative way of intrusion avoidance, in accordance with one aspect of the present disclosure.

FIG. 4(A) illustrates a Wi-Fi obfuscating transmission 175 that is non-overlapping in the frequency domain but is overlapping in the time domain with the BLE RTT packet 173 for the purpose of intrusion avoidance, in accordance with one aspect of the present disclosure. Wi-Fi packets may be transmitted with a bandwidth of 20 MHz or 40 MHz, which is larger than the transmission bandwidth of BLE packets, and may also be transmitted with higher power. FIG. 4(A) shows obfuscating Wi-Fi transmission 175 occupying an adjacent frequency channel or region to BLE RTT packet 173 but having a wider bandwidth and higher amplitude than those of BLE RTT packet 173. In one embodiment, obfuscating Wi-Fi transmission 175 may be implemented as a Wi-Fi packet or preamble that starts earlier and finishes after the transmission of BLE RTT packet 173. Transmitting obfuscating Wi-Fi signal 175 that overlaps in time domain not in frequency domain with, but occupies a frequency region adjacent to, BLE RTT packet 173 forces an intruding receiving device to be narrow band to avoid interference, increasing the complexity and cost of the intruding device.

FIG. 4(B) illustrates a Wi-Fi obfuscating transmission 179 that is overlapping both in the frequency domain and in the time domain with the BLE RTT packet 177 in an alternative way of intrusion avoidance, in accordance with one aspect of the present disclosure. Obfuscating Wi-Fi transmission 179 may be a low energy Wi-Fi packet or preamble occupying a 20 MHz or 40 MHz bandwidth that overlaps in the frequency domain or channel with the higher amplitude but narrower bandwidth BLE RTT packet 177. Transmitting obfuscating Wi-Fi signal 179 that overlaps both in time and frequency domains with BLE RTT packet 177 makes it more difficult for an intruding device to detect BLE RTT packet 177 or its symbols in a noisy environment and degrades the ability of the intruding device to detect early the symbol transitions of the frame synchronization pattern in an ECLD attack or the phase of the constant tone signals.

Figure 5:
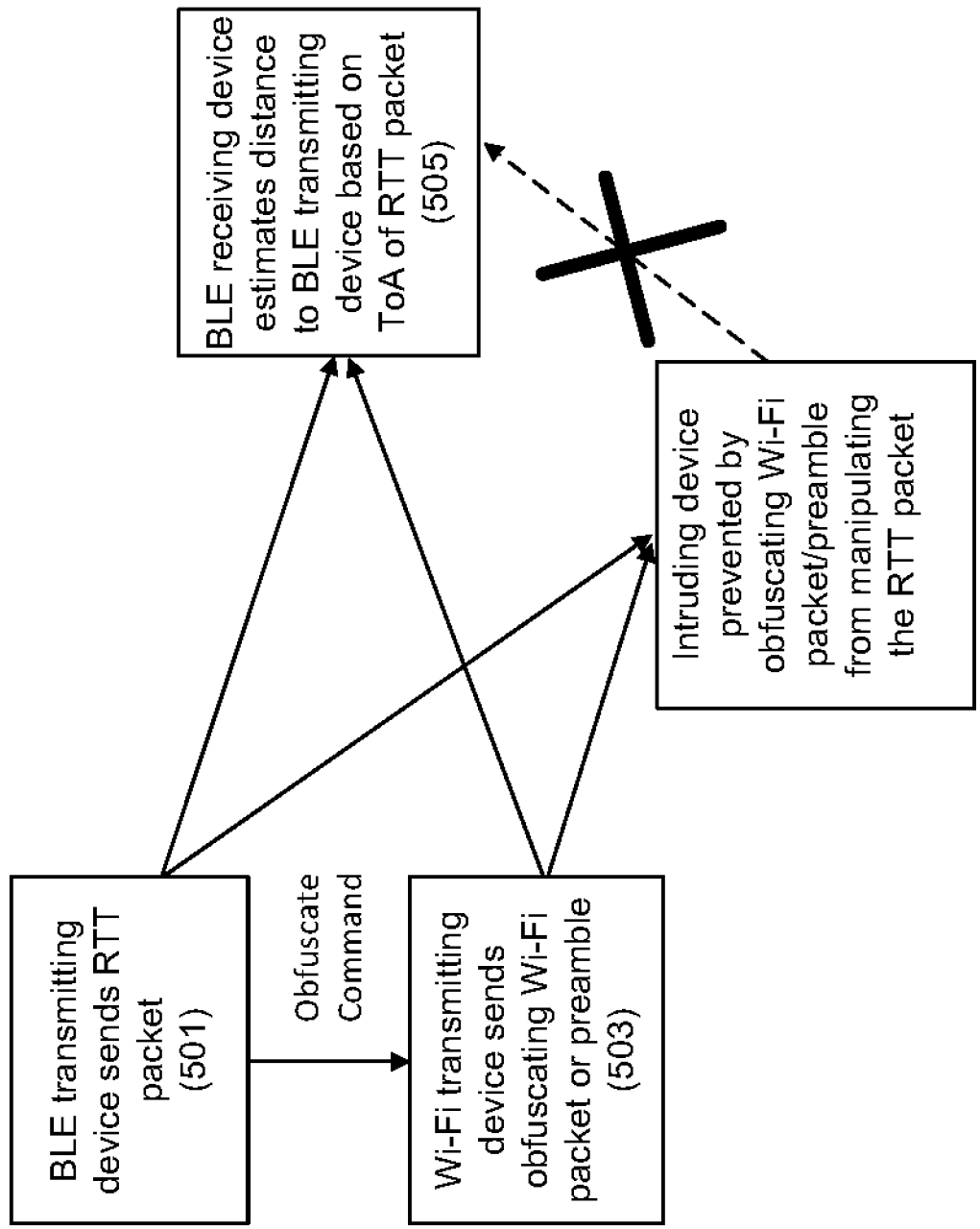
FIG. 5 illustrates the operations of a device having co-located BLE and Wi-Fi transceivers where the Wi-Fi transceiver transmits a Wi-Fi signal to obfuscate the BLE RTT packet to degrade the ability of an intruding device to intercept and manipulate the RTT packet to launch an attack, in accordance with one aspect of the present disclosure.

FIG. 5 illustrates the operations of a device having co-located BLE and Wi-Fi transceivers where the Wi-Fi transceiver transmits a Wi-Fi signal to obfuscate the BLE RTT packet to degrade the ability of an intruding device to intercept and manipulate the RTT packet to launch an attack, in accordance with one aspect of the present disclosure.

In operation 501, a BLE transceiver of an initiator or reflector may transmit an RTT packet as part of a localization procedure. The BLE transceiver may send a command to a co-located Wi-Fi transceiver to transmit an obfuscating signal. In one embodiment, the command may include the power, timing, and frequency channel of the Wi-Fi transmission.

In operation 503, the co-located Wi-Fi transceiver may transmit an obfuscating Wi-Fi packet or preamble that overlaps in time with the BLE RTT packet based on the command. In one embodiment, the obfuscating Wi-Fi packet or preamble may also overlap in frequency with the BLE RTT packet.

In operation 505, a BLE receiving device of a reflector or initiator may receive the BLE RTT packet to measure the ToA of the BLE RTT packet by ignoring or filtering out the obfuscating Wi-Fi signal. For example, the BLE receiving device may measure the correlation peak of the frame synchronization pattern or the phases of the constant tone signals to determine the ToA of the BLE RTT packet. In one embodiment, if the BLE receiving device is the initiator, it may estimate the range to the BLE transmitting device (e.g., reflector) based on two-way RTT packet traveling time.

An intruding device may be prevented by the obfuscating Wi-Fi signals from detecting early the transitions in the symbols of the frame synchronization pattern or the phases of the constant tone signals in the BLE RTT packet. The intruding device may thus be thwarted in its attempt to manipulate the BLE RTT packet to successfully launch an attack.

Figure 6:
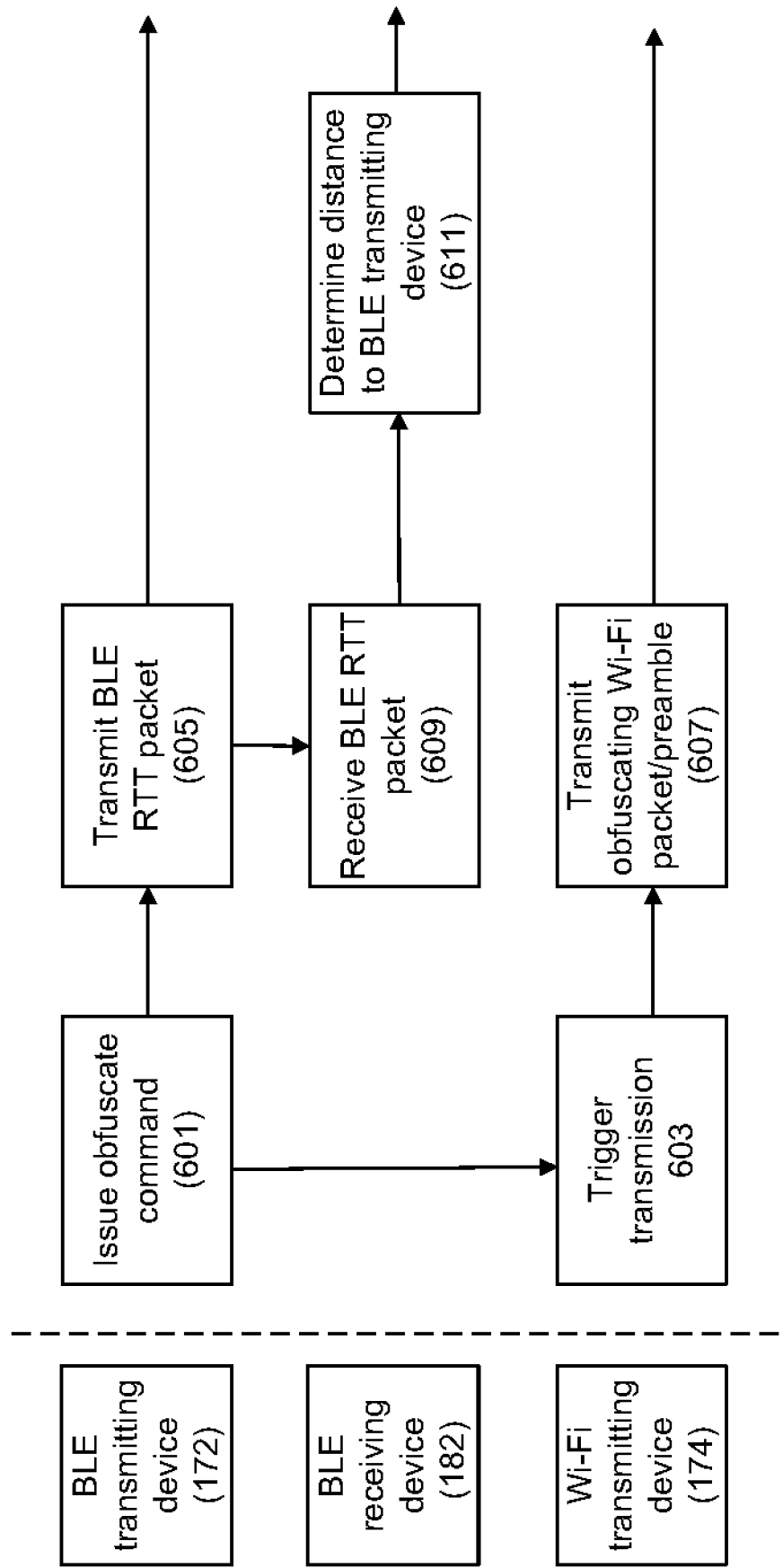
FIG. 6 illustrates a message and data flow diagram of a device with co-located BLE and Wi-Fi transceivers to transmit a BLE RTT packet and an obfuscating Wi-Fi signal to a BLE receiving device to reduce the probability of an intrusion attack so that the receiving device may estimate the range to the transmitting device, in accordance with one aspect of the present disclosure.

FIG. 6 illustrates a message and data flow diagram of a device with co-located BLE and Wi-Fi transceivers to transmit a BLE RTT packet and an obfuscating Wi-Fi signal to a BLE receiving device to reduce the probability of an intrusion attack so that the receiving device may estimate the range to the transmitting device, in accordance with one aspect of the present disclosure. The co-located BLE and Wi-Fi transceivers, and the BLE receiving device may be the transmitting BLE device 172, the transmitting Wi-Fi device 174, and the receiving BLE device 182 of FIG. 3, respectively.

In operation 601, the BLE transceiver may issue a command to the co-located Wi-Fi transceiver to transmit an obfuscating signal. The command may contain characteristics such as timing, power, bandwidth, frequency channel of the transmission.

In operation 603, the Wi-Fi transceiver may process the command to schedule the transmission of the obfuscating signal. In one embodiment, there may be multiple scheduled transmissions each with its own timing, power, bandwidth, frequency channel, etc.

In operation 605, the BLE transceiver may transmit a BLE RTT packet. The BLE RTT packet may contain ranging information to allow a receiving device to determine the distance to the BLE transceiver.

In operation 607, the Wi-Fi transceiver may transmit the scheduled obfuscating Wi-Fi packet or preamble that overlaps in time with the BLE RTT packet. In one embodiment, the obfuscating Wi-Fi packet or preamble may additionally overlap in frequency with the BLE RTT packet.

In operation 609, the BLE receiving device may receive the BLE RTT packet in the presence of the obfuscating Wi-Fi packet or preamble. The BLE receiving device may measure the ToA of the BLE RTT packet.

In operation 611, the BLE receiving device may estimate the distance to the transmitting BLE device based on the ToA measurement of the BLE RTT packet. The BLE receiving device may grant the transmitting BLE device access to a secured resource if the estimated distance is below a threshold.

Figure 7:
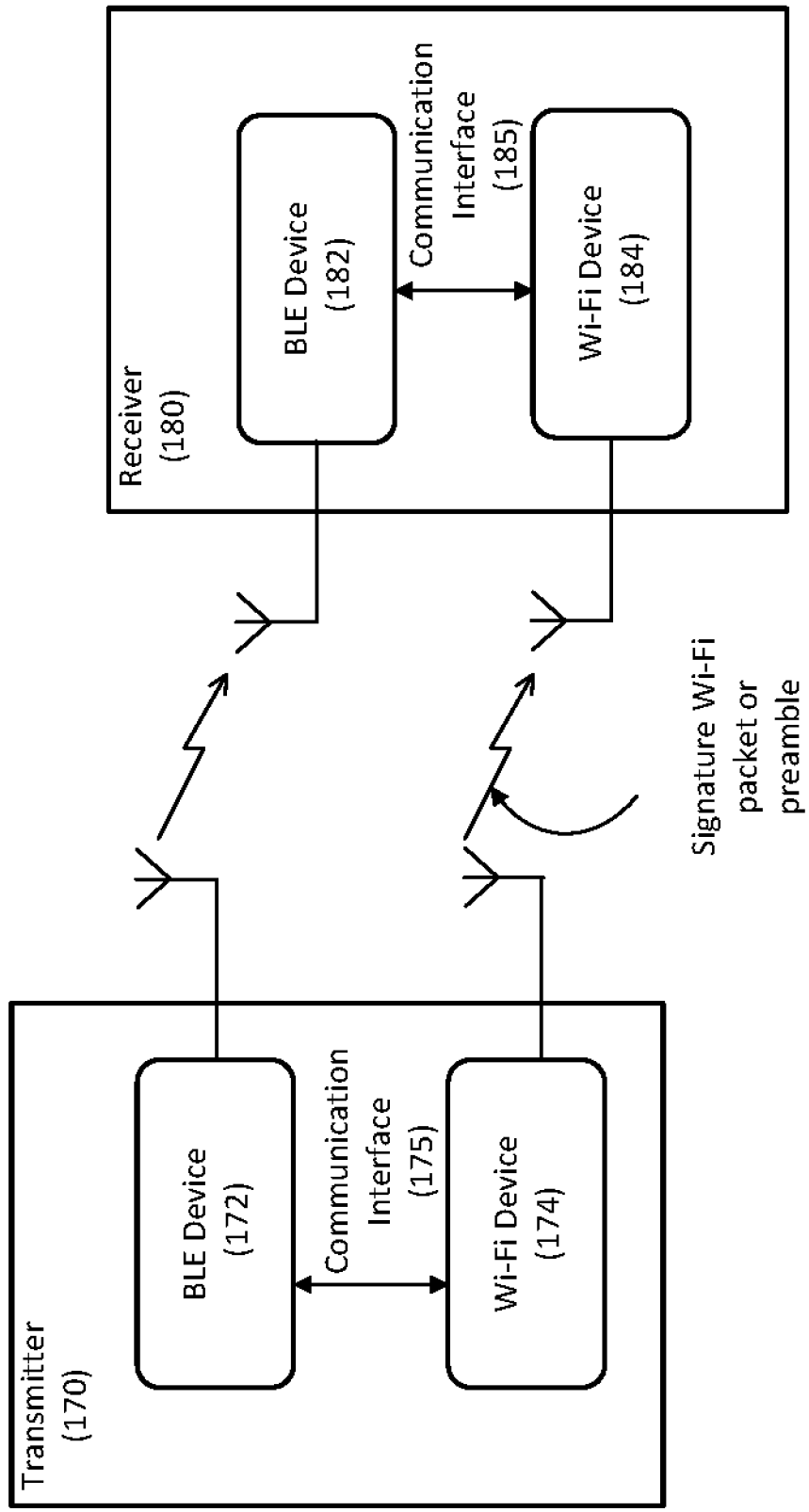
FIG. 7 illustrates a functional block diagram of a BLE device using a co-located Wi-Fi transceiver to transmit a signature Wi-Fi signal concurrently with the BLE RTT packet to a receiving device that also has co-located BLE and Wi-Fi transceivers for the receiving device to measure changes in a pre-determined signaling relationship between the BLE and Wi-Fi transmissions to detect an intrusion attempt, in accordance with one aspect of the present disclosure.

FIG. 7 illustrates a functional block diagram of a BLE device using a co-located Wi-Fi transceiver to transmit a signature Wi-Fi signal concurrently with the BLE RTT packet to a receiving device that also has co-located BLE and Wi-Fi transceivers for the receiving device to measure changes in a pre-determined signaling relationship between the BLE and Wi-Fi transmissions to detect an intrusion attempt, in accordance with one aspect of the present disclosure.

A transmitter 170 of a ranging and localization system may contain a BLE device 172 and a co-located Wi-Fi device 174. A receiver 180 of the ranging and localization system may similarly contain a BLE device 182 and a co-located Wi-Fi device 184. Transmitter 170 may be an initiator or a reflector. Receiver 180 may also be an initiator or a reflector. Transmitter 170 may transmit Wi-Fi signals concurrently with the transmissions of BLE RTT packets. The Wi-Fi signals may be Wi-Fi signature packets or signature preambles that have characteristics known mutually by transmitter 170 and receiver 180. For example, a signature Wi-Fi packet may have a pre-determined power ratio, temporal relationship, spectral relationship, channel location, or other signal metrics with respect to the BLE RTT packet. In one embodiment, to eliminate the need to demodulate Wi-Fi packets, a signature Wi-Fi preamble that has a pre-determined power ratio, temporal relationship, spectral relationship, channel location, or other signal metrics with respect to the BLE RTT packet may be transmitted. Using communication interface 175, BLE device 172 may command its co-located Wi-Fi device 174 to transmit signature Wi-Fi signals when transmitter 170 is transmitting ranging signals. In some embodiments, the signature Wi-Fi signals and the BLE RTT packets may or may not overlap in the frequency domain as with the obfuscating Wi-Fi signals.

Receiver 180 may receive the concurrently transmitted Wi-Fi signals and BLE RTT packets. For example, BLE device 182 of receiver 180 may receive the BLE RTT packets to measure their ToA, amplitude, and other signal characteristics. BLE device 182 may estimate the distance to transmitter 170 based on the ToA measurements. Wi-Fi device 184 of receiver 180 may receive the Wi-Fi signals to measure their characteristics. Wi-Fi device 184 may determine if the characteristics of the received Wi-Fi signals conform to the pre-determined signature values. Wi-Fi device 184 may communicate the characteristics of the received Wi-Fi signals to BLE device 182 through communication interface 185. In one embodiment, if the characteristics of the received Wi-Fi signals deviate from the pre-determined value, Wi-Fi device 184 may report a suspected intrusion.

In one embodiment, BLE device 182 may determine if the relationship in the signal characteristics between the received BLE RTT packets and the received Wi-Fi signals deviate from the pre-determined metrics to reveal an intrusion attempt. For example, if the relative power or the relative timing of the BLE RTT packets and the Wi-Fi signals deviate from the pre-determined power ratio or the pre-determine temporal relationship, it may indicate an intrusion attempt when an intruding device is manipulating the BLE RTT while leaving the signature Wi-Fi signals untouched. As a result, the intruding device is forced to manipulate both transmissions in order to launch an attack that preserves the pre-determined relationship between the two transmission to evade detection by the co-located BLE and Wi-Fi devices, resulting in increased complexity and cost.

Figure 8:
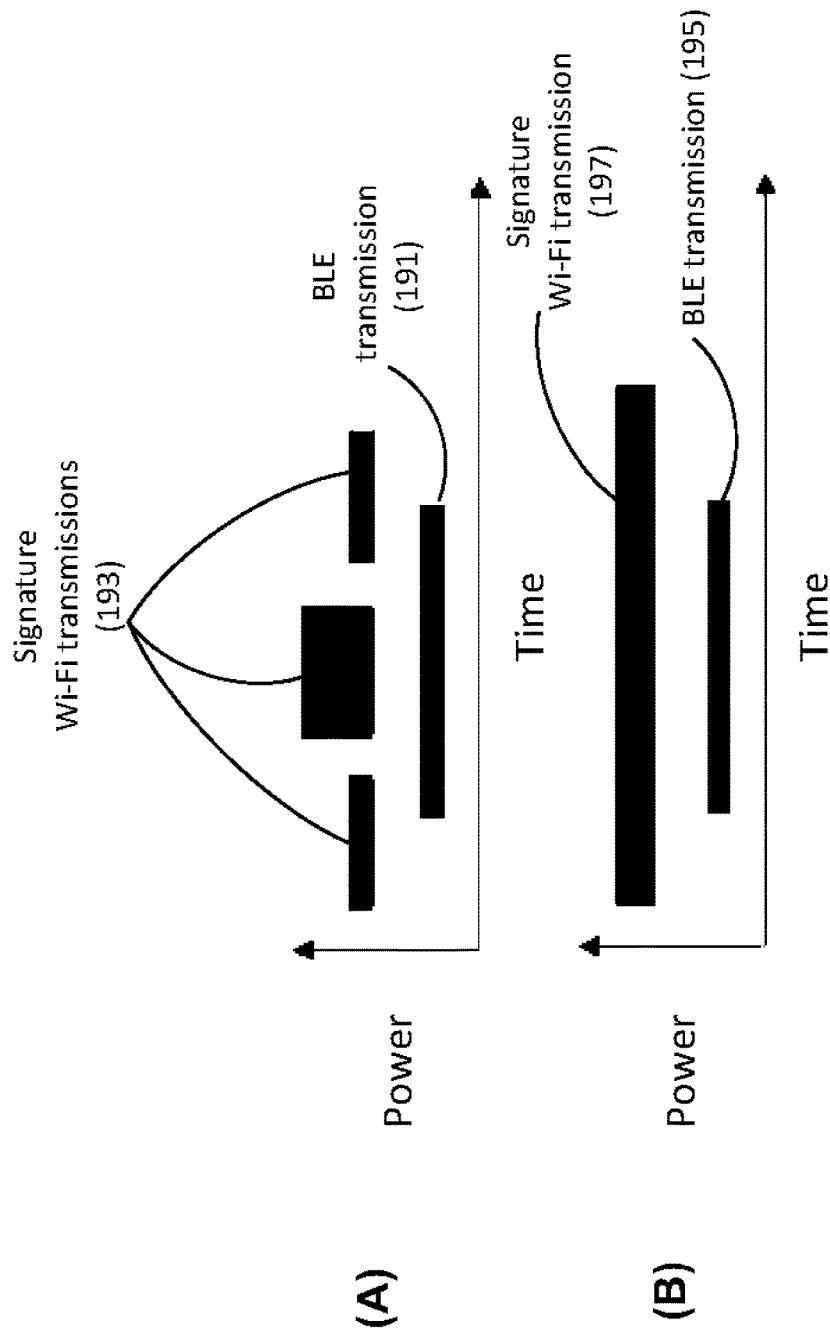
FIG. 8(A) illustrates a first scenario of the pre-determined relationship in power and timing between multiple signature Wi-Fi transmissions and the BLE transmission for a receiving device with co-located BLE and Wi-Fi transceivers to detect an intrusion attempt based on changes in the pre-determined relationship of the received signals, in accordance with one aspect of the present disclosure.
FIG. 8(B) illustrates a second scenario of the pre-determined relationship in power and timing between the signature Wi-Fi transmission and the BLE transmission for a receiving device with co-located BLE and Wi-Fi transceivers to detect an intrusion attempt based on changes in the pre-determined relationship of the received signals, in accordance with one aspect of the present disclosure.

FIG. 8(A) illustrates a first scenario of the pre-determined relationship in power and timing between multiple signature Wi-Fi transmissions 193 and a BLE transmission 191 for a receiving device with co-located BLE and Wi-Fi transceivers to detect an intrusion attempt based on changes in the pre-determined relationship of the received signals, in accordance with one aspect of the present disclosure. Signature Wi-Fi transmissions 193 may include multiple packets or preambles each with its pre-determined power and timing relative to the RTT packet of BLE transmission 191. For example, a first Wi-Fi packet or preamble may begin before the BLE packet begins and end before the BLE packet ends. A second Wi-Fi packet or preamble may begin after the BLE packet begins and end before the BLE packet ends. A third Wi-Fi packet or preamble may begin after the BLE packet begins and end after the BLE packet ends. In one embodiment, one or more of the Wi-Fi packets or preambles may overlap in the frequency domain with the BLE packet. Each Wi-Fi packet or preamble may change its power, duration, and spectral relation.

FIG. 8(B) illustrates a second scenario of the pre-determined relationship in power and timing between a signature Wi-Fi transmission 197 and a BLE transmission 195 for a receiving device with co-located BLE and Wi-Fi transceivers to detect an intrusion attempt based on changes in the pre-determined relationship of the received signals, in accordance with one aspect of the present disclosure. Signature Wi-Fi signature 197 may include a Wi-Fi packet or preamble that is longer in time duration and higher in power than the BLE packet of BLE transmission 195. The Wi-Fi or preamble packet may begin before the BLE packet begins and end after the BLE packet ends. In one embodiment, the Wi-Fi packet or preamble may overlap in the frequency domain with the BLE packet. The temporal and power relationship between the signature Wi-Fi transmissions and BLE transmissions of FIGS. 8(A) and 8(B) are deterministic and mutually agreed-upon between the transmitter device and the receiving device, but may appear random to an intruding device.

Figure 9:
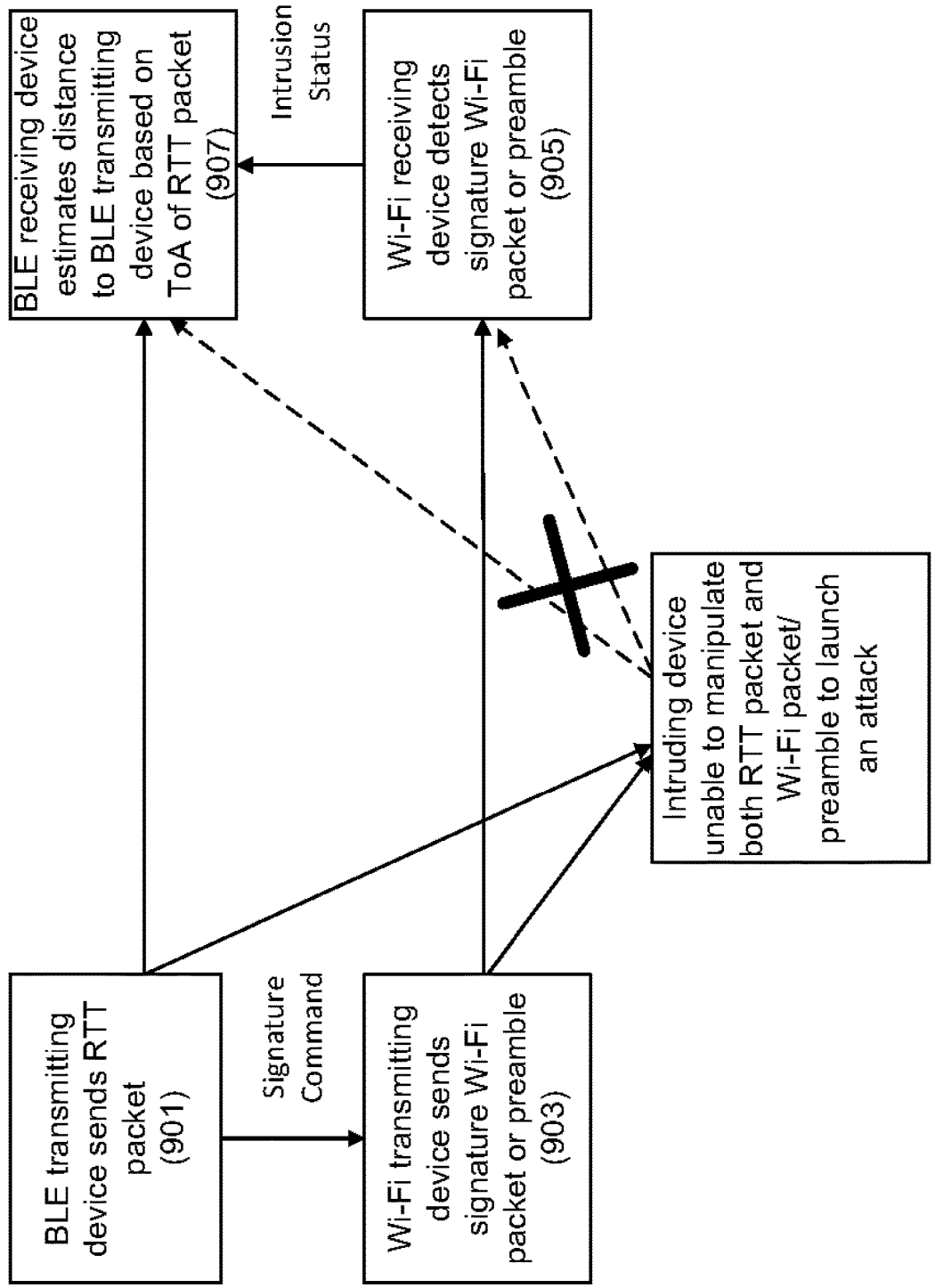
FIG. 9 illustrates the operations of a device having co-located BLE and Wi-Fi transceivers to transmit concurrently a signature Wi-Fi signal and a BLE RTT packet for a receiving device also with co-located BLE and Wi-Fi transceivers to measured changes in a pre-determined relationship between the signature Wi-Fi signal and the BLE RTT packet to detect an intrusion attempt, in accordance with one aspect of the present disclosure.

FIG. 9 illustrates the operations of a device having co-located BLE and Wi-Fi transceivers to transmit concurrently a signature Wi-Fi signal and a BLE RTT packet for a receiving device also with co-located BLE and Wi-Fi transceivers to measured changes in a pre-determined relationship between the signature Wi-Fi signal and the BLE RTT packet to detect an intrusion attempt, in accordance with one aspect of the present disclosure.

In operation 901, a BLE transceiver of an initiator or reflector may transmit an RTT packet as part of a localization procedure. The BLE transceiver may send a command to a co-located Wi-Fi transceiver to transmit a signature Wi-Fi signal. In one embodiment, the command may include the power, timing, bandwidth, frequency channel, and other signal characteristics of the Wi-Fi transmission.

In operation 903, the co-located Wi-Fi transceiver may transmit one or more signature Wi-Fi packets or preambles that overlap in time with the BLE RTT packet based on the command. In one embodiment, the signature Wi-Fi packets or preambles may also overlap in frequency with the BLE RTT packet.

In operation 905, a Wi-Fi receiving device of a reflector or initiator may receive the signature Wi-Fi packets or preambles to measure their signal characteristics and may ignore or filter out the BLE transmission. In one embodiment, the Wi-Fi receiving device may receive a command from a co-located BLE receiving device to treat a Wi-Fi signal as signature Wi-Fi signals. The expected signal characteristics of the signature Wi-Fi signals are known by the Wi-Fi receiving device. The Wi-Fi receiving device may determine how the measured characteristics of the received signature Wi-Fi signals compare to the expected values. The Wi-Fi receiving device may report the measured characteristics or the status of the comparison between the measured and expected characteristics to the BLE receiving device.

In operation 907, a BLE receiving device of a reflector or initiator may receive the BLE RTT packet to measure the ToA of the BLE RTT packet and may ignore or filter out the signature Wi-Fi signal. For example, the BLE receiving device may measure the correlation peak of the frame synchronization pattern or the phases of the constant tone signals to determine the ToA of the BLE RTT packet. In one embodiment, if the BLE receiving device is the initiator, it may estimate the range to the BLE transmitting device (e.g., reflector) based on two-way RTT packet traveling time.

When the BLE receiving device receives information on the measured characteristics of the Wi-Fi signals from the co-located Wi-Fi receiving device, the BLE receiving device may determine if the relationship in the signal characteristics between the received BLE RTT packets and the signature Wi-Fi signals deviate from pre-determined metrics to reveal an intrusion attempt. For example, if the relative power or the relative timing of the BLE RTT packets and the Wi-Fi signals deviates from a pre-determined power ratio or a pre-determine temporal relationship, it may indicate manipulations of only the BLE RTT packets by an intruding device. Unless the intruding device is able to manipulate both the RTT packet and the signature Wi-Fi packets or preambles, receiving the concurrently transmitted BLE RTT packet and signature Wi-Fi signals by the co-located BLE and Wi-Fi receiving devices increases the probability of intrusion detection.

Figure 10:
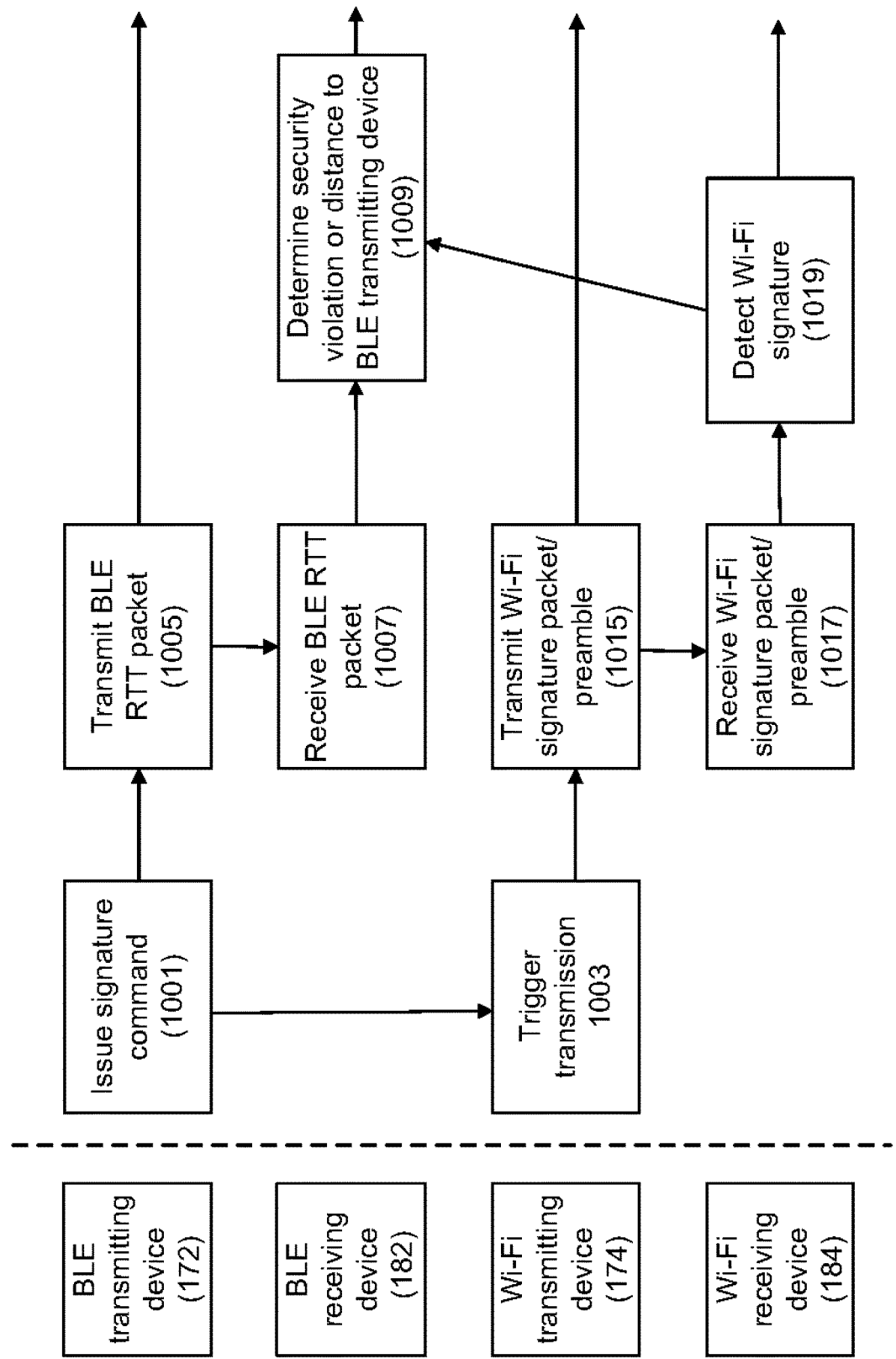
FIG. 10 illustrates a message and data flow diagram of a device having co-located BLE and Wi-Fi transceivers transmitting concurrently a signature Wi-Fi signal and a BLE RTT packet for a receiving device also with co-located BLE and Wi-Fi transceivers to measured changes in a pre-determined relationship between the signature Wi-Fi signal and the BLE RTT packet to detect an intrusion attempt or to estimate the range to the transmitting device, in accordance with one aspect of the present disclosure.

FIG. 10 illustrates a message and data flow diagram of a device having co-located BLE and Wi-Fi transceivers transmitting concurrently a signature Wi-Fi signal and a BLE RTT packet for a receiving device also with co-located BLE and Wi-Fi transceivers to measured changes in a pre-determined relationship between the signature Wi-Fi signal and the BLE RTT packet to detect an intrusion attempt or to estimate the range to the transmitting device, in accordance with one aspect of the present disclosure. The co-located BLE and Wi-Fi transceivers on the transmitting side and the co-located BLE and Wi-Fi transceivers on the receiving side may be the BLE device 172, Wi-Fi device 174, BLE device 182, and Wi-Fi device 184 of FIG. 7, respectively. The co-located BLE and Wi-Fi transceivers on the transmitting side may be referred to as the BLE transmitting device and the Wi-Fi transmitting device, respectively. The co-located BLE and Wi-Fi transceivers on the receiving side may be referred to as the BLE receiving device and the Wi-Fi receiving device, respectively.

In operation 1001, the BLE transmitting device may issue a command to the co-located Wi-Fi transceiver to transmit a signature Wi-Fi signal. In one embodiment, the command may include the power, timing, bandwidth, frequency channel, and other signal characteristics of the Wi-Fi transmission. In one embodiment, the signal characteristics of the Wi-Fi transmission may be pre-determined and known by the co-located Wi-Fi transmitting device and the Wi-Fi receiving device.

In operation 1003, the Wi-Fi transmitting device may process the command to schedule the transmission of the signature Wi-Fi signal. In one embodiment, there may be multiple scheduled Wi-Fi packets or preambles each with its own timing, power, bandwidth, frequency channel, etc.

In operation 1005, the BLE transmitting device may transmit a BLE RTT packet. The BLE RTT packet may contain ranging information to allow the BLE receiving device to determine the distance to the BLE transmitting device.

In operation 1015, the Wi-Fi transmitting device may transmit the scheduled signature Wi-Fi packets or preambles that overlap in time with the BLE RTT packet. In one embodiment, the signature Wi-Fi packets or preambles may additionally overlap in frequency with the BLE RTT packet.

In operation 1007, the BLE receiving device may receive the BLE RTT packet and may ignore the Wi-Fi signal. The BLE receiving device may measure the ToA of the BLE RTT packet and other characteristics of the BLE RTT packet. The BLE receiving device may instruct the co-located Wi-Fi receiving device to receive the signature Wi-Fi signal during the time when the BLE RTT packet is received.

In operation 1017, the Wi-Fi receiving device may receive the signature Wi-Fi packets or preambles to measure their signal characteristics and may ignore the BLE transmission. The expected signal characteristics of the signature Wi-Fi packets or preambles may be known by the Wi-Fi receiving device per prior communication with the Wi-Fi transmitting device or by prior agreement between devices of a ranging and localization system.

In operation 1019, the Wi-Fi receiving device may determine how the measured characteristics of the signature Wi-Fi packets or preambles compare to the expected values. The Wi-Fi receiving device may report the measured characteristics or the status of the comparison between the measured and expected characteristics to the BLE receiving device.

In operation 1009, the BLE receiving device may evaluate the report from the Wi-Fi receiving device or determine if the relationship in the signal characteristics between the received BLE RTT packets and the signature Wi-Fi signal deviate from pre-determined metrics to detect an intrusion attempt. The pre-determined metrics may be received by the BLE receiving device through prior communication with the BLE transmitting device or by prior agreement between devices of a ranging and localization system. If no intrusion attempt is detected, the BLE receiving device (e.g., initiator) may estimate the distance to the transmitting BLE device based on the time of flight (ToF) measurement, which may be based on a two-way RTT packet traveling time. In one embodiment, BLE receiving device (e.g., reflector) may report an intrusion attempt to initiator.

Figure 11:
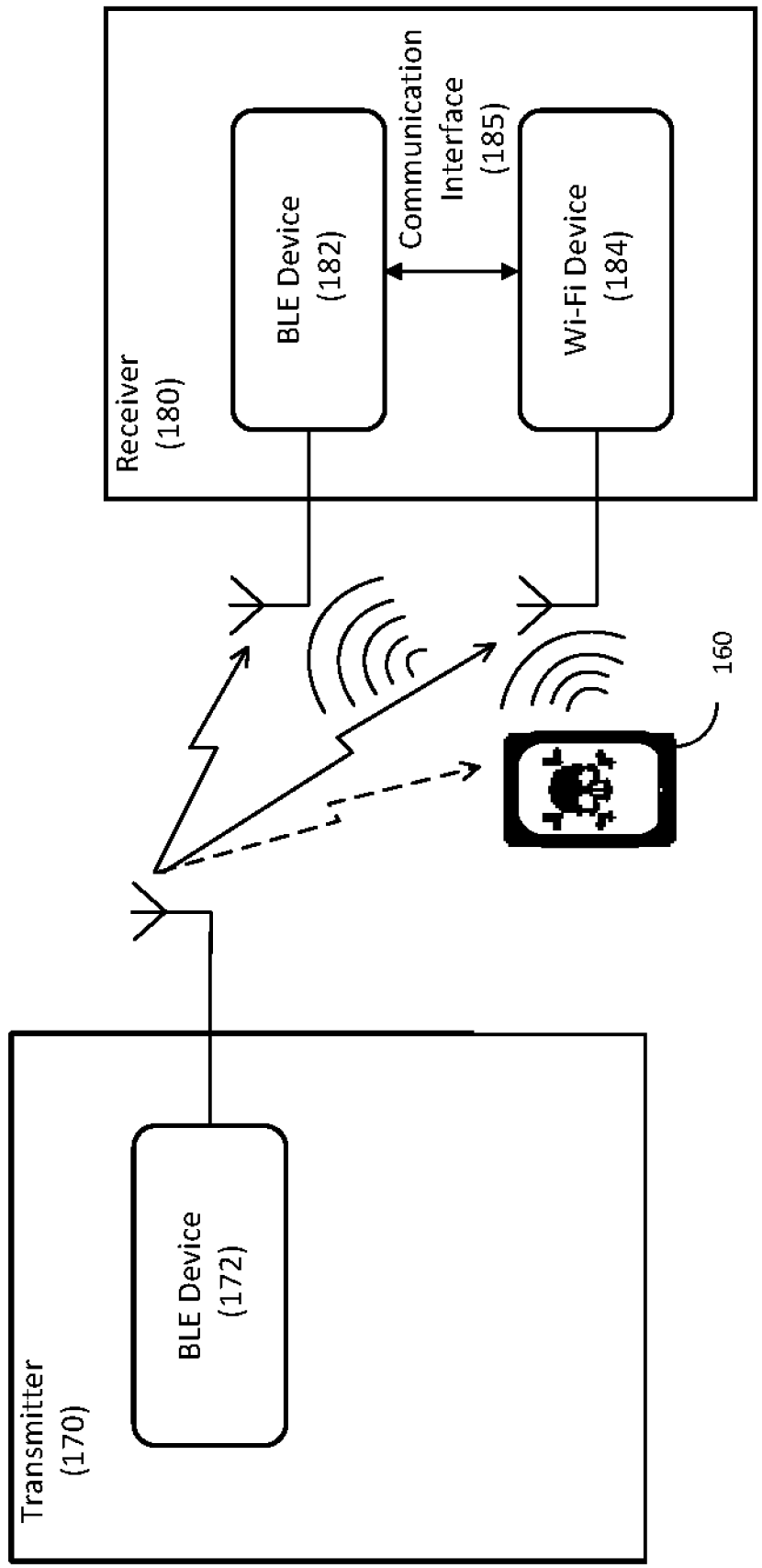
FIG. 11 illustrates a functional block diagram of a BLE receiving device using a co-located Wi-Fi transceiver to capture a part of a BLE RTT packet transmitted by a BLE transmitting device or manipulated by an intruding device simultaneously with a BLE transceiver of the BLE receiving device receiving the BLE RTT packet for the Wi-Fi transceiver or the BLE transceiver to detect an intrusion attempt, in accordance with one aspect of the present disclosure.

FIG. 11 illustrates a functional block diagram of a BLE receiving device using a co-located Wi-Fi transceiver to capture a part of a BLE RTT packet transmitted by a BLE transmitting device or manipulated by an intruding device simultaneously with a BLE transceiver of the BLE receiving device receiving the BLE RTT packet for the Wi-Fi transceiver or the BLE transceiver to detect an intrusion attempt, in accordance with one aspect of the present disclosure.

The advantages of using a co-located Wi-Fi receiver or transceiver to capture BLE RTT packets containing frame synchronization patterns or constant tone signals is its wide receiving bandwidth and high sampling rate. For example, the bandwidth of Wi-Fi receivers are 20 MHz or 40 MHz, wider than that of BLE receivers, to receive Wi-Fi packets that are transmitted with a bandwidth of 20 MHz or 40 MHz. Wi-Fi receivers also have higher sampling rate ($\geq$80 MHz) compared to BLE receivers ($\leq$12 MHz) to generate I/Q samples. The combination of the wider bandwidth and higher sampling rate of Wi-Fi receivers affords better spectral resolution to detect anomalies or distortions in the signals of the BLE RTT packet caused by manipulations by an intruding device. The Wi-Fi receiver also provides antenna spatial diversity for an independent observation of the BLE ranging signals. In one aspect, the BLE ranging signals captured by the Wi-Fi receiver and the BLE receiver may also provide angle of arrival (AoA) capability to improve the security against an attack.

A transmitter 170 of a ranging and localization system may contain a BLE device 172 to transmit a BLE RTT packet. A receiver 180 of the ranging and localization system may contain a BLE device 182 and a co-located Wi-Fi device 184. Transmitter 170 may be an initiator or a reflector. Receiver 180 may also be an initiator or a reflector. When BLE device 182 detects the BLE RTT packet, it may trigger co-located Wi-Fi device 184 through a communication interface 185 to capture a part of the BLE RTT packet, such as the frame delimiter containing the frame synchronization pattern or the constant tone signals encapsulated in a ranging portion used for ToA estimation. BLE device 184 may issue commands to control the size of the signal capture performed by Wi-Fi device 184 such as by controlling the timing, duration, receiving bandwidth, sampling rate, etc., of the BLE transmission capturing process.

Wi-Fi device 184 may capture parts of or the whole BLE RTT packet as commanded using its wider receiving bandwidth and higher sampling rate. If an intruding device 160 launches an attack to manipulate the BLE RTT packet, Wi-Fi device 184 may be better able to detect phase anomalies or distortions in the captured BLE signal compared to BLE device 182. Wi-Fi device 184 may report to BLE device 182 measurements of the captured BLE signal or the status of intrusion detection through communication interface 185. In one embodiment, intrusion detection using a co-located Wi-Fi receiver during BLE RTT packet transmission may be performed on the BLE transmitting side.

Figure 12:
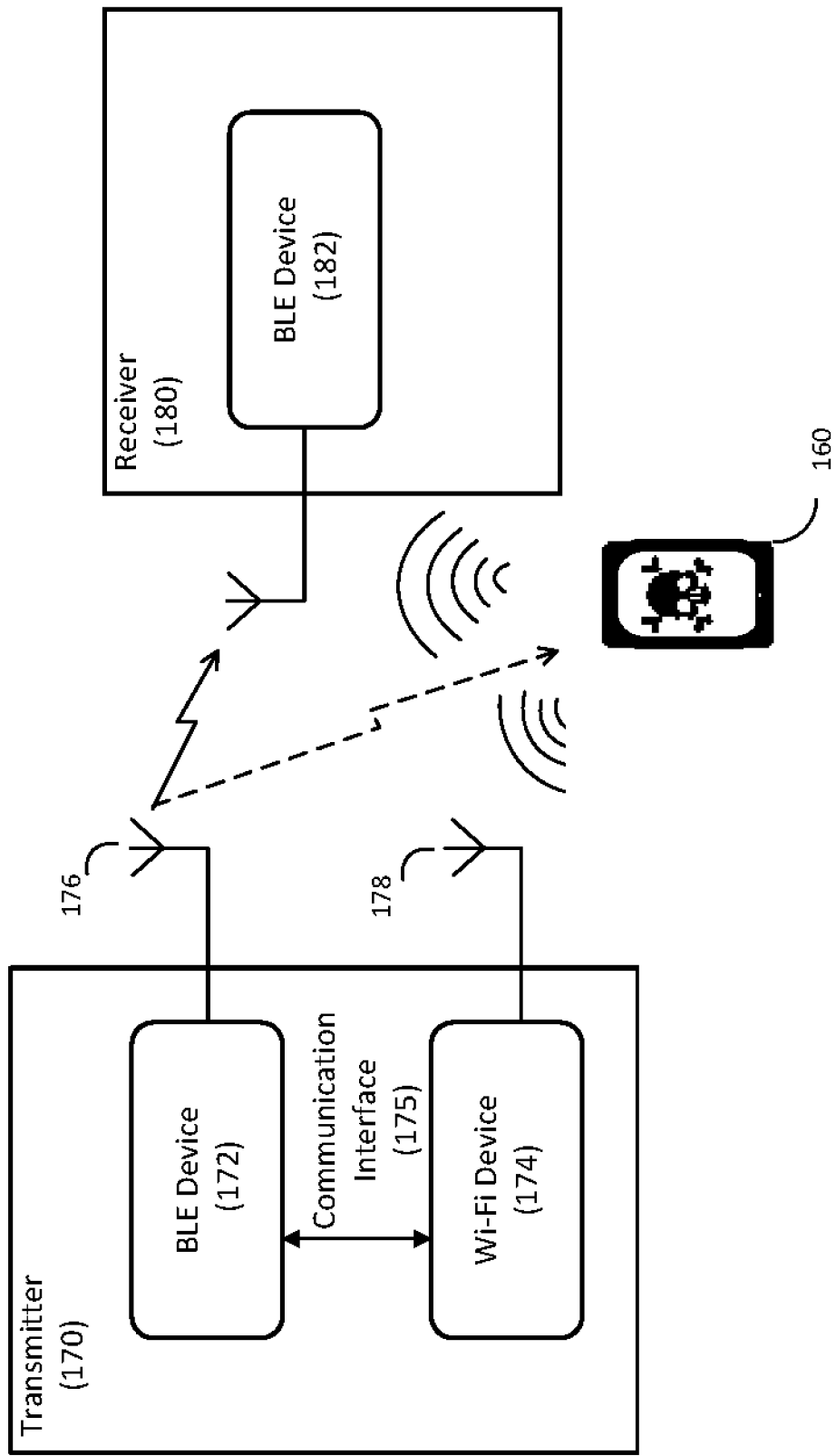
FIG. 12 illustrates a functional block diagram of a BLE transmitting device using a co-located Wi-Fi transceiver to capture a part of a BLE RTT packet intercepted and manipulated by an intruding device to detect an intrusion attempt when the BLE transmitting device transmits the BLE RTT packet to a receiving device, in accordance with one aspect of the present disclosure.

FIG. 12 illustrates a functional block diagram of a BLE transmitting device using a co-located Wi-Fi transceiver to capture a part of a BLE RTT packet intercepted and manipulated by an intruding device to detect an intrusion attempt when the BLE transmitting device transmits the BLE RTT packet to a receiving device, in accordance with one aspect of the present disclosure.

A transmitter 170 of a ranging and localization system may contain a BLE device 172 to transmit a BLE RTT packet. Transmitter 170 may contain a co-located Wi-Fi device 174. When BLE device 172 transmits the BLE RTT packet, it may trigger co-located Wi-Fi device 174 through a communication interface 175 to capture manipulated BLE signals that may be transmitted by an intruding device 160. BLE device 172 may issue commands to control the size or other parameters of the signal capture performed by Wi-Fi device 174. Transmitter 170 may be an initiator or a reflector.

A receiver 180 of the ranging and localization system may contain a BLE device 182 to receive the BLE RTT packet to measure the ToA and to estimate the distance to transmitter 170. Receiver 180 may be an initiator or a reflector. While transmitter 170 is shown as using co-located Wi-Fi device 174 to capture BLE transmission concurrently with transmitter 170 transmitting a BLE RTT packet, receiver 180 that has a co-located Wi-Fi device may similarly capture BLE transmission concurrently with receiver 180 transmitting a BLE RTT packet. The capture of BLE transmission by a co-located Wi-Fi device is therefore independent of the role of initiator and reflector in a ranging and localization system.

In one aspect, to improve the capability of Wi-Fi device 174 to capture BLE signals from an intruding device, reception of BLE RTT packet from co-located BLE device 172 may be suppressed. Thus, an antennas 176 of BLE device 172 and an antenna 178 of Wi-Fi device 174 may be decoupled. In one embodiment, when antenna 176 and antenna 178 are closely located on transmitter 170 such as a smartphone or a key fob with space constraints, the antennas may use different polarizations to achieve sufficient decoupling. In one embodiment, when antenna 176 and antenna 178 have better spatial separation such as co-located devices on a vehicle, the antennas may have different directionalities or beam-forming capability to improve the ability of Wi-Fi device 174 to detect intrusion while BLE device 172 is concurrently transmitting the BLE RTT packet.

Wi-Fi device 174 may capture BLE signals as commanded using its wider receiving bandwidth and higher sampling rate. Wi-Fi device 174 may report to BLE device 172 measurements of the captured BLE signal or the status of intrusion detection through communication interface 175. BLE device 172 may determine a security violation based on the information. In one embodiment, BLE device 172 may communicate the security violation to BLE device 182 of receiver 180.

Figure 13:
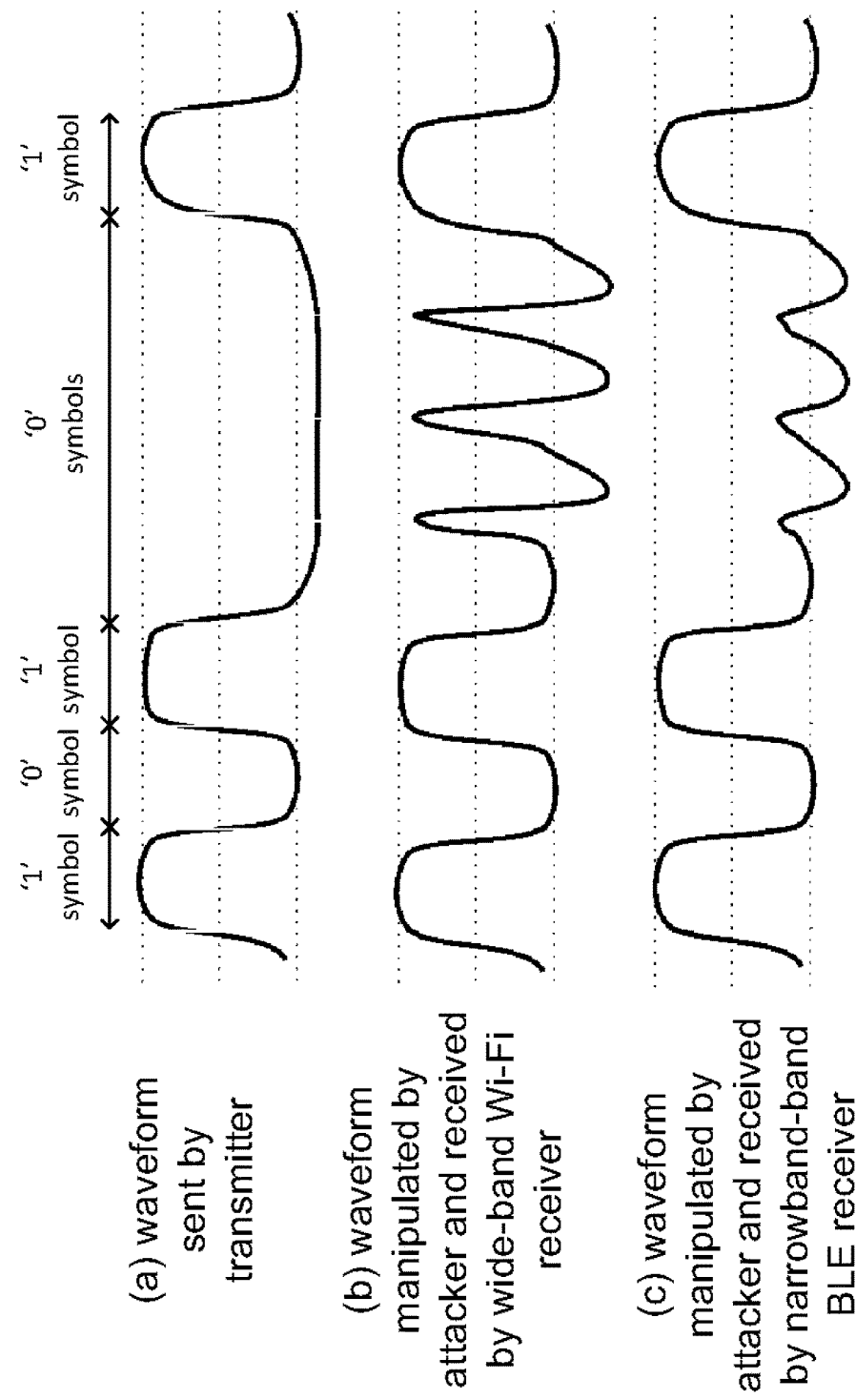
FIG. 13 illustrates the signal waveform of an early commit late detect (ECLD) attack showing the distortions added by an intruding device to a frame synchronization pattern intercepted from a BLE transmitting device and the distorted frame synchronization pattern as received by a Wi-Fi receiver compared to that received by a BLE receiver to detect the intrusion attempt, in accordance with one aspect of the present disclosure.

FIG. 13 illustrates the signal waveform of an early commit late detect (ECLD) attack showing the distortions added by an intruding device to a frame synchronization pattern intercepted from a BLE transmitting device and the distorted frame synchronization pattern as received by a Wi-Fi receiver compared to that received by a BLE receiver to detect the intrusion attempt, in accordance with one aspect of the present disclosure.

The BLE transmitting device may transmit a packet containing a BLE frame synchronization pattern to the BLE receiver. In one embodiment, the frame synchronization pattern may span 32 symbols transmitted with a symbol rate of 1 megabits per second (Mbps). In one embodiment, the symbols of the frame synchronization pattern may be modulated using frequency-shift-keying (FSK) technique such as Gaussian FSK (GFSK). In one embodiment, a '1' bit of the frame synchronization pattern may be transmitted with a symbol frequency offset of +250 KHz and a '0' bit may be transmitted with a symbol frequency offset of −250 KHz from the carrier frequency of the transmission. The phase change across a symbol for 1 Mbps symbol rate may thus be +/−90 degrees. Other symbol length, symbol rate, and/or modulation techniques for the frame synchronization pattern are also possible.

Waveform (a) of FIG. 13 illustrates a waveform of a few symbols of the frame synchronization pattern transmitted by the BLE transmitting device. The transmitted symbols are shown as 10100001 with the two polarities representing different frequency signals in GFSK modulation. The BLE receiver is in a scan mode to detect the frame synchronization pattern and to estimate the range to the keyless entry device based on the time of reception of the frame synchronization pattern. Because the BLE receiver estimates that the BLE transmitting device is not within an acceptable distance to the BLE receiver, the BLE receiver does not grant to the BLE transmitting device access to a secured resource.

An intruder seeking access to the secured resource may use a device to launch an ECLD attack by intercepting the frame synchronization pattern from the BLE transmitting device (or signals transmitted by the BLE receiver to the BLE transmitting device). The intruding device may act as a relay to repeat the signals so that the relayed signals are stronger and to manipulate the relayed signals so that they appear earlier to the BLE receiver to spoof the BLE receiver into believing the BLE transmitting device is closer so the secured resource may be unlocked.

Waveform (b) of FIG. 13 illustrates a waveform of the symbols of the frame synchronization pattern intercepted by the intruding device and manipulated to appear earlier when transmitted. To accomplish this, the intruding device may assume that whenever a BLE symbol is detected, the next symbols will be the opposite polarity of the current symbol (In another embodiment, the intruding device may assume that the next symbols will be the same polarity as the current symbol). This pattern is repeated so that the symbol following the next symbol will be assumed to be the opposite of the next symbol and so on. With this assumption, the intruding device transmits an alternating series of symbols prior to intercepting and detecting the polarities of the symbols from BLE transmitting device. When the intruding device determines that a symbol sent is of the wrong polarity, it quickly changes the polarity of the symbol to effectively transmit a "compressed" version of the wrong polarity symbol as illustrated. Therefore, if the polarity of the symbols from the BLE transmitting device is changing, the intruding device is able to replicate the waveform. However, if there is no symbol polarity change the intruding device has to quickly change the wrong polarity so that the apparent symbols may be correctly detected by the BLE receiver.

Waveform (c) of FIG. 13 illustrates a waveform of the manipulated symbols of the frame synchronization pattern as detected by the BLE receiver. The quick change to the polarity of the symbols may generate strong swings in phase in FSK modulated signals. However, the narrowband bandwidth of the BLE receiver may smooth the phase distortion so that the manipulated symbols may evade detection. For example, a correlator of the BLE receiver may integrate of the phase of the received signals over each symbol such that the correlation peak may still exceed a detection threshold despite the phase distortion introduced by the symbol manipulation.

By using the wider bandwidth and the higher sampling rate of a Wi-Fi receiver to receive the manipulated symbols of the frame synchronization pattern, the phase distortions of the manipulated symbols may be detected. In one embodiment, waveform (b) of FIG. 13 may represent the frame synchronization pattern as detected by the Wi-Fi receiver. Due to better spectral resolution of the Wi-Fi receiver, the phase distortions occurring at the beginning of symbols when there is no symbol polarity change are detected and reported as an intrusion attempt.

Figure 14:
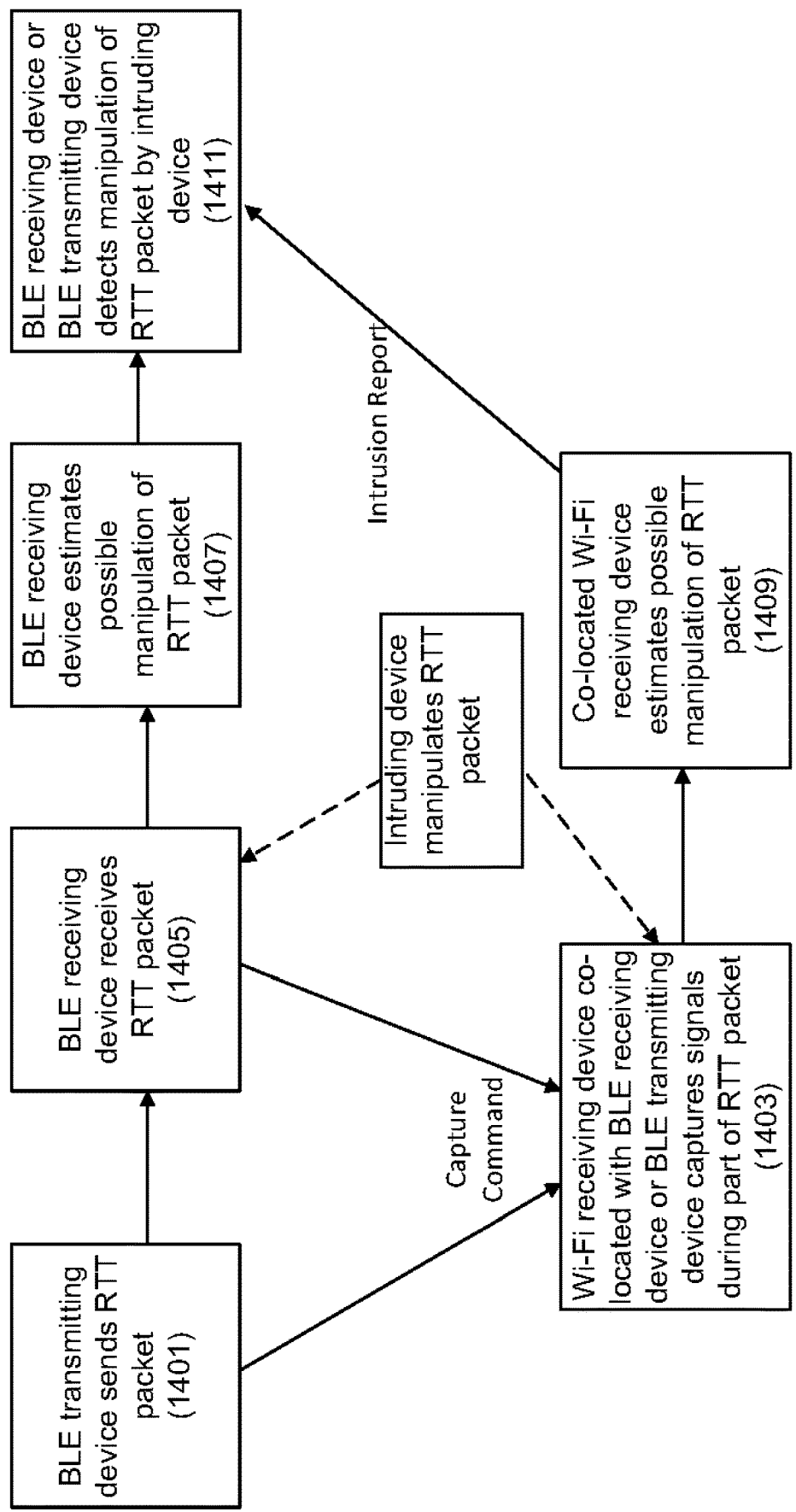
FIG. 14 illustrates the operations of a BLE transmitting device transmitting a BLE RTT packet and the BLE transmitting device using a co-located Wi-Fi transceiver to capture a part of a manipulated BLE RTT packet to detect an intrusion attempt or a BLE receiving device using a co-located Wi-Fi transceiver to capture a part of the manipulated BLE RTT packet to detect an intrusion attempt simultaneously with a BLE transceiver of the BLE receiving device receiving the BLE RTT packet, in accordance with one aspect of the present disclosure.

FIG. 14 illustrates the operations of a BLE transmitting device transmitting a BLE RTT packet and the BLE transmitting device using a co-located Wi-Fi transceiver to capture a part of a manipulated BLE RTT packet to detect an intrusion attempt or a BLE receiving device using a co-located Wi-Fi transceiver to capture a part of the manipulated BLE RTT packet to detect an intrusion attempt simultaneously with a BLE transceiver of the BLE receiving device receiving the BLE RTT packet, in accordance with one aspect of the present disclosure.

In operation 1401, a BLE transmitting device of an initiator or reflector may transmit an RTT packet as part of a localization procedure. The BLE transmitting device may send a command to a co-located Wi-Fi transceiver to capture manipulated BLE signals that may be transmitted by an intruding device. The capture command may control the size of the signal capture such as the timing, duration, receiving bandwidth, sampling rate, etc., of the BLE signal capturing process performed by the Wi-Fi transceiver.

In operation 1405, a BLE receiving device of a reflector or initiator may detect the BLE RTT packet. The BLE receiving device may send a capture command to a co-located Wi-Fi transceiver to capture parts of or the whole BLE RTT packet. The capture command may control the size and other parameters of the BLE RTT packet captured by the co-located Wi-Fi transceiver.

In operation 1403, the Wi-Fi transceiver co-located with the BLE transmitting device or with the BLE receiving device may capture BLE signals as commanded using its wider receiving bandwidth and higher sampling rate. The captured BLE signals may include manipulated BLE RTT packet transmitted by an intruding device.

In operation 1409, the Wi-Fi transceiver may measure characteristics of the captured BLE signals to detect possible manipulation of the BLE RTT packet by the intruding device. For example, the Wi-Fi transceiver may measure phase anomalies or distortions in the captured BLE signal to determine the probability of an intrusion. The Wi-Fi transceiver may report the measurements or the status of intrusion detection to the co-located BLE device.

In operation 1407, the BLE receiving device may measure characteristics of the received BLE RTT packet to detect or to estimate the probability of an intrusion. Due to its narrowband bandwidth and lower sampling rate, the characteristics of the BLE RTT packet measured by the BLE receiving device may have a lower spectral resolution than the characteristics measured and reported by the co-located Wi-Fi transceiver.

In operation 1411, the BLE receiving device or the BLE transmitting device may evaluate the measurements or the intrusion report received from the co-located Wi-Fi transceiver to detect manipulations of the BLE RTT packet by the intruding device. For the BLE receiving device, if there is no security violation, the BLE receiving device may estimate the distance to the BLE transmitting device based on the ToA of the BLE RTT packet. In one embodiment, for the BLE transmitting device, if there is a security violation, the BLE transmitting device my communicate the security violation to the BLE receiving device.

Figure 15:
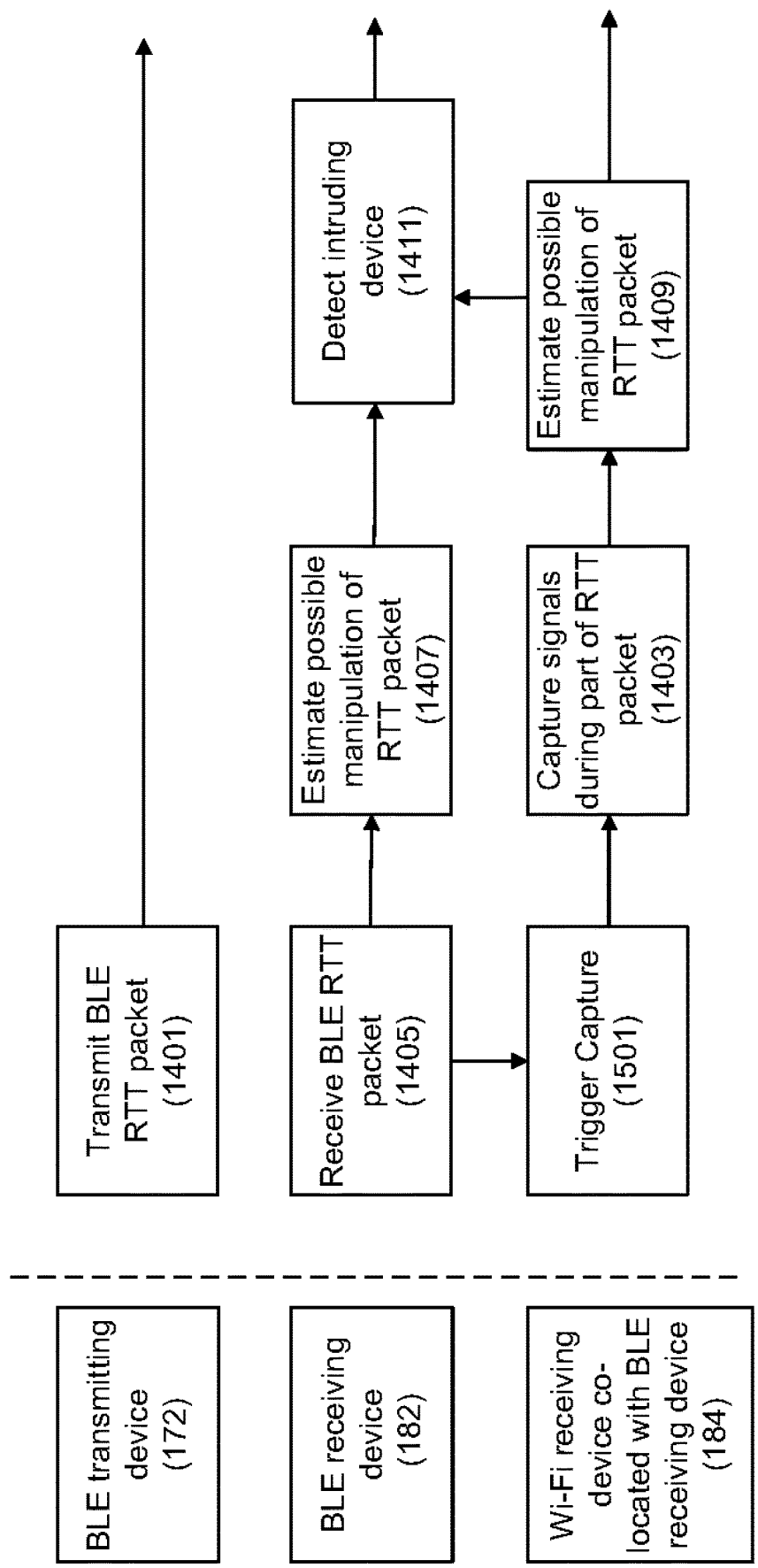
FIG. 15 illustrates a message and data flow diagram of a BLE transmitting device transmitting a BLE RTT packet and a receiving device using a co-located Wi-Fi transceiver to capture a part of a manipulated BLE RTT packet simultaneously with a BLE transceiver receiving the BLE RTT packet for the co-located Wi-Fi transceiver or BLE transceiver to detect an intrusion attempt, in accordance with one aspect of the present disclosure.

FIG. 15 illustrates a message and data flow diagram of a BLE transmitting device transmitting a BLE RTT packet and a receiving device using a co-located Wi-Fi transceiver to capture a part of a manipulated BLE RTT packet simultaneously with a BLE transceiver receiving the BLE RTT packet for the co-located Wi-Fi transceiver or BLE transceiver to detect an intrusion attempt, in accordance with one aspect of the present disclosure. The BLE transmitting device, the BLE transceiver, and the co-located Wi-Fi transceiver may be the BLE device 172, BLE device 182, and Wi-Fi device 184 of FIG. 11. The BLE transceiver may also be referred to as the BLE receiving device.

In operation 1401, the BLE transmitting device may transmit a BLE RTT packet. The BLE RTT packet may contain ranging information to allow the BLE receiving device to determine the distance to the BLE transmitting device.

In operation 1405, the BLE receiving device may detect the BLE RTT packet. The BLE receiving device may measure the ToA of the BLE RTT packet. The BLE receiving device may send a capture command to the co-located Wi-Fi transceiver to capture parts of or the whole BLE RTT packet. The capture command may control the size and other parameters of the BLE RTT packet captured by the co-located Wi-Fi transceiver.

In operation 1501, the Wi-Fi transceiver may receive the capture command to trigger the capture of parts of or the whole BLE RTT packet. The Wi-Fi transceiver may control the timing, duration, receiving bandwidth, sampling rate, etc., of the capture process as commanded. For example, the timing and duration may correspond to the frame synchronization pattern in the frame delimiter or the constant tone signals in the ranging portion of the BLE RTT packet.

In operation 1403, the Wi-Fi transceiver may capture the BLE RTT packet or its part using its wider receiving bandwidth and higher sampling rate. The captured BLE signals may include manipulated BLE RTT packet transmitted by an intruding device.

In operation 1409, the Wi-Fi transceiver may measure characteristics of the captured BLE signals to detect possible manipulation of the BLE RTT packet by the intruding device. For example, the Wi-Fi transceiver may measure phase anomalies or distortions in the captured BLE signal to determine the probability of an intrusion. The Wi-Fi transceiver may report the measurements or the status of intrusion detection to the BLE receiving device.

In operation 1407, the BLE receiving device may measure characteristics of the received BLE RTT packet to estimate the probability of manipulations of the BLE RTT packet. The characteristics of the BLE RTT packet measured by the BLE receiving device may have a lower spectral resolution than the characteristics measured and reported by the co-located Wi-Fi transceiver.

In operation 1411, the BLE receiving device may evaluate the measured characteristics of the received BLE RTT packet aided by the measurements or the intrusion report received from the co-located Wi-Fi transceiver to detect the intruding device. If no intruding device is detected, the BLE receiving device may estimate reception time of the BLE RTT packet. If receiving device is initiator, it may determine the distance to the BLE transmitting (e.g., reflector) device based on the ToF (two-way RTT packet traveling time). If receiving device is reflector, it may inform initiator about an intrusion attempt.

Figure 16:
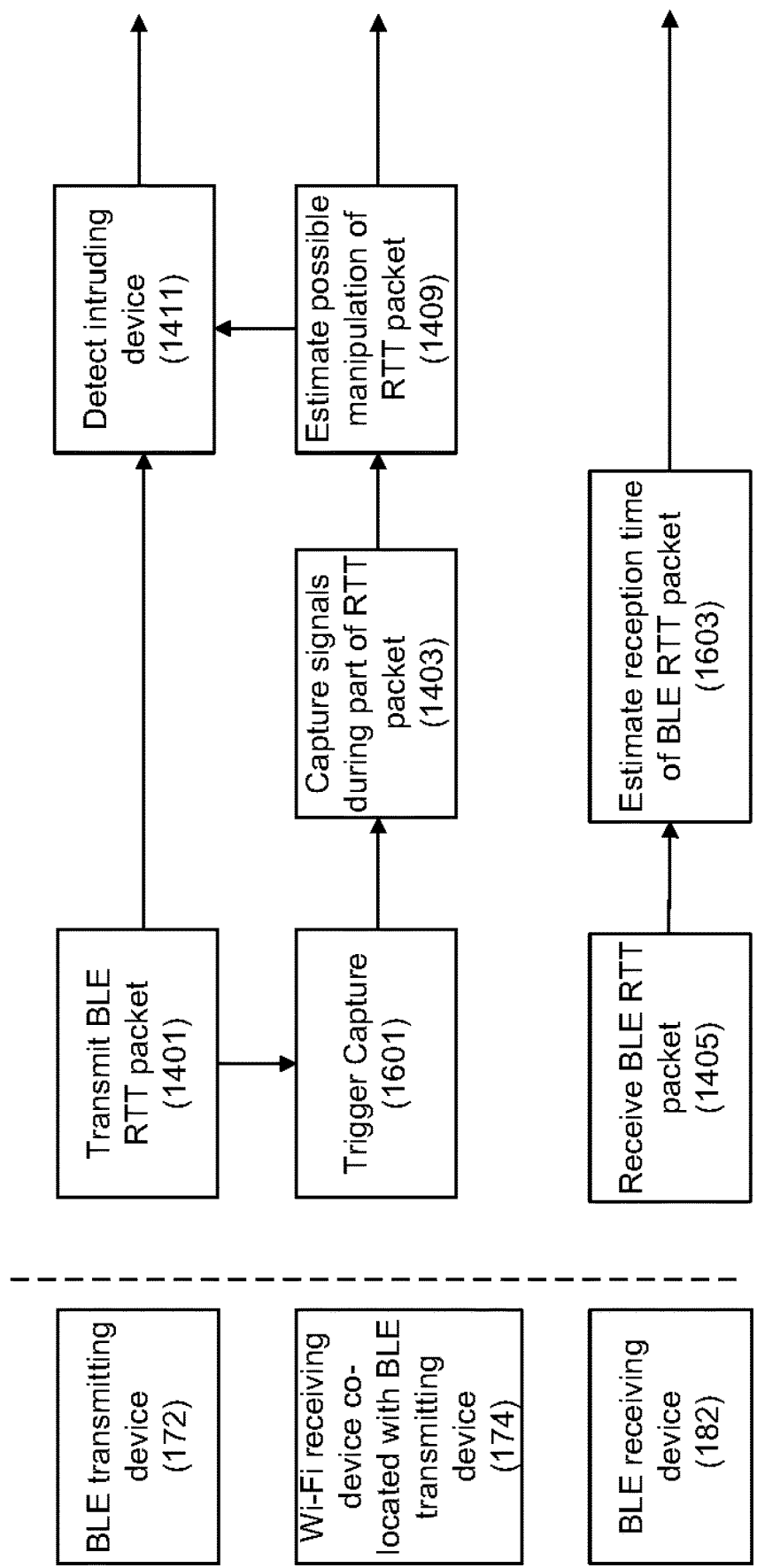
FIG. 16 illustrates a message and data flow diagram of a BLE transmitting device transmitting a BLE RTT packet and using a co-located Wi-Fi transceiver to capture a part of a manipulated BLE RTT packet to detect an intrusion attempt when the BLE transmitting device transmits the BLE RTT packet to a BLE receiving device for the BLE receiving device to estimate the range to the BLE transmitting device, in accordance with one aspect of the present disclosure.

FIG. 16 illustrates a message and data flow diagram of a BLE transmitting device transmitting a BLE RTT packet and using a co-located Wi-Fi transceiver to capture a part of a manipulated BLE RTT packet to detect an intrusion attempt when the BLE transmitting device transmits the BLE RTT packet to a BLE receiving device for the BLE receiving device to estimate the range to the BLE transmitting device, in accordance with one aspect of the present disclosure. The BLE transmitting device, the co-located Wi-Fi transceiver, and the BLE receiving device may be the BLE device 172, Wi-Fi device 174, and BLE device 182 of FIG. 12.

In operation 1401, the BLE transmitting device may transmit a BLE RTT packet. The BLE transmitting device may send a command to the co-located Wi-Fi transceiver to capture manipulated BLE signals that may be transmitted by an intruding device. The capture command may control the size of the signal capture such as the timing, duration, receiving bandwidth, sampling rate, etc., of the BLE signal capturing process performed by the Wi-Fi transceiver.

In operation 1601, the Wi-Fi transceiver may receive the capture command to trigger the capture of parts of the BLE signals. For example, the parts of the BLE signals to be captured may include the frame synchronization pattern of a manipulated BLE RTT packet.

In operation 1403, the Wi-Fi transceiver may capture parts of the BLE signal using its wider receiving bandwidth and higher sampling rate. In one embodiment, to improve the ability of the Wi-Fi transceiver to detect intrusion and to suppress reception of the BLE RTT packet transmitted by the BLE transmitting device, the antennas of BLE transmitting device and the antenna of the Wi-Fi device may be decoupled by using different polarizations or different directionalities.

In operation 1409, the Wi-Fi transceiver may measure characteristics of the captured BLE signal. For example, the Wi-Fi transceiver may measure phase anomalies or distortions in the captured BLE signal to determine the probability of an intrusion. The Wi-Fi transceiver may report the measurements or the status of intrusion detection to the co-located BLE transmitting device.

In operation 1411, the BLE transmitting device may evaluate the measurements or the intrusion report received from the co-located Wi-Fi transceiver to detect manipulations of the BLE RTT packet by the intruding device. In one embodiment, if the intruding device is detected, the BLE transmitting device my communicate the security violation to the BLE receiving device.

In operation 1405, the BLE receiving device may detect the BLE RTT packet. The BLE receiving device may measure the reception time of the BLE RTT packet. If receiving device is initiator, it may determine the distance to the BLE transmitting (e.g., reflector) device based on the ToF (two-way RTT packet traveling time). If receiving device is reflector, it may inform initiator about an intrusion attempt.

In operation 1603, the BLE receiving device may estimate the reception time of the BLE RTT packet. In one embodiment, the BLE receiving device may estimate the reception time if no security violation is reported by the BLE transmitting device.

Figure 17:
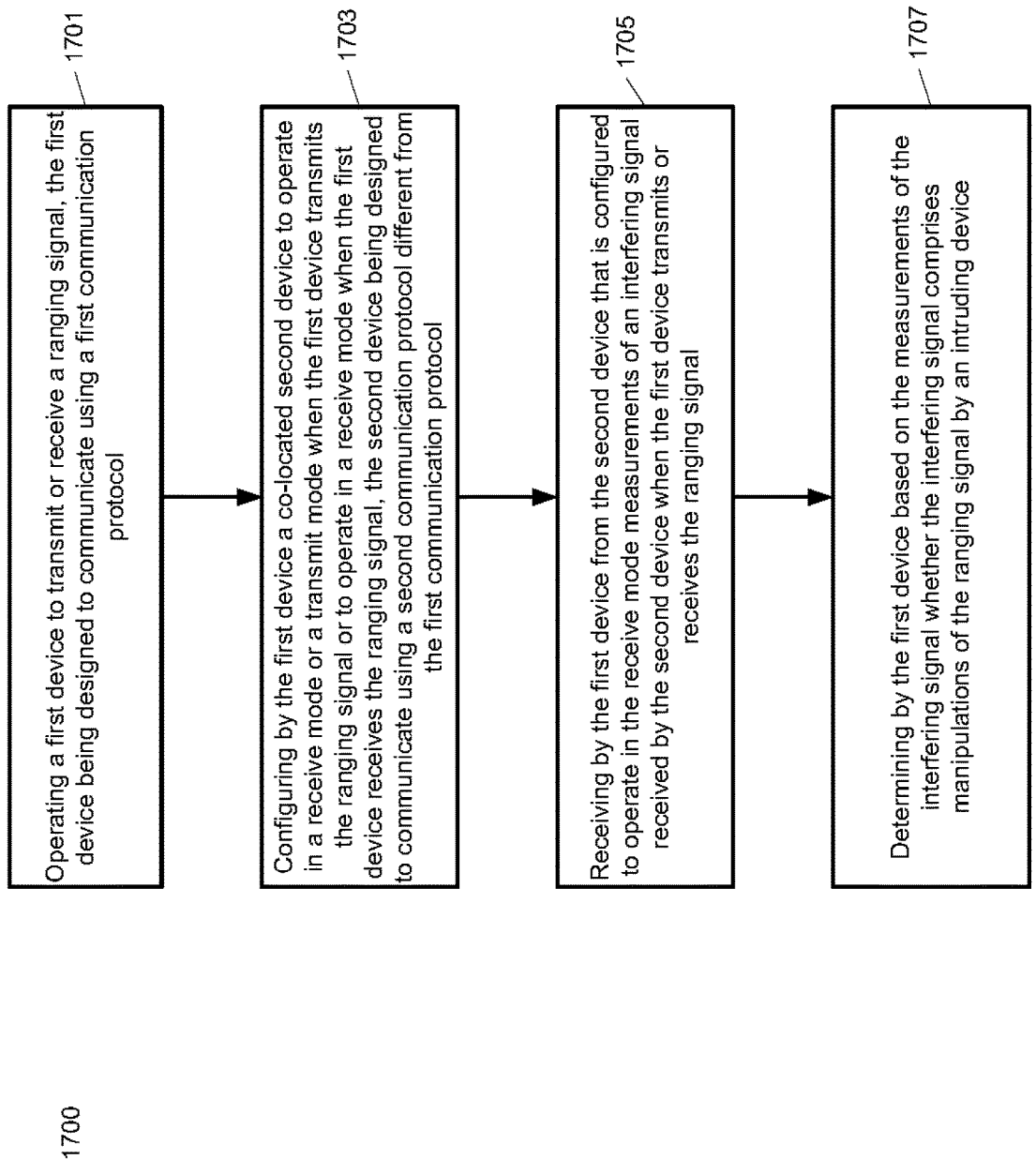
FIG. 17 illustrates a flow diagram of a method for operating two co-located communication devices designed for different communication protocols to degrade the ability of an intruding device to launch a MITM attack of a ranging signal or to measure a manipulation of a ranging signal to detect the MITM attack, in accordance with one aspect of the present disclosure.

FIG. 17 illustrates a flow diagram of a method 1700 for operating two co-located communication devices designed for different communication protocols to degrade the ability of an intruding device to launch a MITM attack of a ranging signal or to measure a manipulation of a ranging signal to detect the MITM attack, in accordance with one aspect of the present disclosure. In one aspect, method 1700 may be performed by the devices, radios, or transceivers of FIGS. 1-3, 5-7, 9-12, and 14-16 utilizing hardware, software, or combinations of hardware and software.

In operation 1701, a first device transmits or receives a ranging signal. The first device is designed to communicate using a first communication protocol. In one embodiment, the first device is a BLE transceiver configured to transmit BLE RTT packets.

In operation 1703, the first device configures a co-located second device to operate in a receive mode or a transmit mode when the first device transmits the ranging signal or to operate in a receive mode when the first device receives the ranging signal. The second device is designed to communicate using a second communication protocol different from the first communication protocol. In one embodiment, the second device is a Wi-Fi transceiver configured to transmit or receive Wi-Fi packets or preambles. In one embodiment, the second device is a Wi-Fi receiver configured to sample BLE signals.

In operation 1705, the first device receives from the second device configured to operate in the receive mode measurements of an interfering signal received by the second device when the first device transmits or receives the ranging signal. In one embodiment, the second device may capture manipulated BLE RTT packets to aid in intrusion detection.

In operation 1707, the first device determines based on the measurements of the interfering signal whether the interfering signal comprises manipulations of the ranging signal by an intruding device. In one embodiment, manipulations of the ranging signal by the intruding device may include an early commit late detect (ECLD) attack.

Various embodiments of the multi-carrier phase-based ranging system described herein may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular device or other apparatus. Various systems (e.g., such as a wireless device operating in a near field environment, pico area network, wide area network, etc.) may be used in accordance with the teachings described herein, or it may prove convenient to construct more specialized apparatus to perform the required method steps. The required structure for a variety of these systems will appear as set forth in the description above.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of ranging operations by a plurality of devices, the method comprising:
    operating a first device to transmit or receive a ranging signal, the first device being designed to communicate using a first communication protocol;
    configuring, by the first device, a second device co-located with the first device to operate in a receive mode or a transmit mode when the first device transmits the ranging signal or to operate in a receive mode when the first device receives the ranging signal, the second device being designed to communicate using a second communication protocol different from the first communication protocol;
    receiving, by the first device from the second device that is configured to operate in the receive mode, measurements of phase distortions of an interfering signal received by the second device when the first device transmits or receives the ranging signal; and
    determining, by the first device based on the measurements of the interfering signal, whether the interfering signal comprises manipulations of the ranging signal by an intruding device.

2. The method of claim 1, wherein when the second device is configured to operate in the receive mode when the first device receives the ranging signal, the second device receives the interfering signal using a wider receiving bandwidth than a receiving bandwidth used by the first device to receive the ranging signal.

3. The method of claim 1, wherein operating the first device to receive the ranging signal comprises generating measurements of the received ranging signal at a first spectral resolution, and wherein the measurements of the interfering signal received from the second device has a higher spectral resolution than the first spectral resolution of the measurements of the ranging signal generated by the first device.

4. The method of claim 3, wherein determining whether the interfering signal comprises manipulations of the ranging signal by an intruding device comprises:
    detecting the intruding device based on the higher spectral resolution of the measurements of the interfering signal received from the second device.

5. The method of claim 1, wherein when the second device is configured to operate in the receive mode when the first device transmits the ranging signal, determining whether the interfering signal comprises manipulations of the ranging signal by an intruding device comprises:
    detecting the intruding device based on the measurements of the interfering signal received from the second device relative to a waveform of the ranging signal transmitted by the first device.

6. The method of claim 1, wherein configuring the second device to operate in the transmit mode when the first device transmits the ranging signal comprises:

configuring, by the first device, the second device to transmit a signal with characteristics including one or more of a channel bandwidth, an amplitude, or a transmission time window using the second communication protocol when the first device transmits the ranging signal using the first communication protocol.

7. The method of claim 6, wherein the signal transmitted by the second device comprises an obfuscating signal, and wherein the transmission time window of the obfuscating signal is configured to overlaps with a transmission time window of the ranging signal transmitted by the first device.

8. The method of claim 6, wherein the signal transmitted by the second device comprises a signature signal, and wherein the configured characteristics of the signature signal are known to a paired ranging device receiving the signature signal transmitted by the second device and the ranging signal transmitted by the first device.

9. The method of claim 8, wherein the transmission time window of the signature signal is configured to overlap with a transmission time window of the ranging signal, and wherein the ranging signal is received by the paired ranging device using the first communication protocol and the signature signal is received by the paired ranging device using the second communication protocol.

10. The method of claim 1, wherein the first communication protocol comprises communicating using a Bluetooth Low Energy (BLE) signal and the second communication protocol comprises communicating using a Wi-Fi signal.

11. An apparatus comprising:
a first transceiver configured to transmit or receive a ranging signal using a first communication protocol; and
a processing system configured to:
command a second transceiver co-located with the first transceiver to operate in a receive mode or a transmit mode when the first transceiver transmits the ranging signal or to command the second transceiver to operate in a receive mode when the first transceiver receives the ranging signal, wherein the second transceiver is configured to communicate using a second communication protocol different from the first communication protocol;
receive from the second transceiver that has been commanded to operate in the receive mode measurements of phase distortions of an interfering signal received by the second transceiver when the first transceiver transmits or receives the ranging signal; and
determine based on the measurements of the interfering signal whether the interfering signal comprises manipulations of the ranging signal by an intruding device.

12. The apparatus of claim 11, wherein the first transceiver is configured to receive the ranging signal using a first receiving bandwidth, and wherein when the second transceiver is commanded to operate in the receive mode when the first transceiver receives the ranging signal, the second transceiver is configured to receive the interfering signal using a second receiving bandwidth wider than the first receiving bandwidth to generate the measurements of the interfering signal.

13. The apparatus of claim 11, wherein the first transceiver is configured to receive the ranging signal to generate measurements of the ranging signal at a first spectral resolution, and wherein the measurements of the interfering signal received from the second transceiver has a higher spectral resolution than the first spectral resolution.

14. The apparatus of claim 13, wherein the processing system is configured to determine whether the interfering signal comprises manipulations of the ranging signal by an intruding device based on the higher spectral resolution of the measurements of the interfering signal received from the second transceiver.

15. The apparatus of claim 11, wherein when the second transceiver is commanded to operate in the receive mode when the first transceiver transmits the ranging signal, the processing system is configured to determine whether the interfering signal comprises manipulations of the ranging signal by an intruding device based on the measurements of the interfering signal received from the second transceiver relative to a waveform of the ranging signal transmitted by the first transceiver.

16. The apparatus of claim 11, wherein when the second transceiver is commanded to operate in the transmit mode when the first transceiver transmits the ranging signal, the processing system is configured to command the second transceiver to transmit a signal with characteristics including one or more of a channel bandwidth, an amplitude, or a transmission time window using the second communication protocol when the first transceiver is configured to transmit the ranging signal using the first communication protocol.

17. The apparatus of claim 16, wherein the signal transmitted by the second transceiver comprises an obfuscating signal, and wherein the transmission time window of the obfuscating signal is commanded by the processing system to overlaps with a transmission time window of the ranging signal transmitted by the first transceiver.

18. The apparatus of claim 16, wherein the signal transmitted by the second transceiver comprises a signature signal, and wherein the configured characteristics of the signature signal are known to a paired ranging device configured to receive the signature signal transmitted by the second transceiver and the ranging signal transmitted by the first transceiver.

19. The apparatus of claim 18, wherein the transmission time window of the signature signal is commanded by the processing system to overlap with a transmission time window of the ranging signal, and wherein the ranging signal is received by the paired ranging device using the first communication protocol and the signature signal is received by the paired ranging device using the second communication protocol.

20. A wireless system comprising:
a first antenna;
a first transceiver coupled to the first antenna and configured to communicate using a first communication protocol;
a second antenna;
a second transceiver coupled to the second antenna and configured to communicate using a second communication protocol different from the first communication protocol; and
a processing system configured to:
control the first transceiver to transmit or receive a ranging signal;
control the second transceiver to operate in a receive mode or a transmit mode when the first transceiver transmits the ranging signal or to operate in a receive mode when the first transceiver receives the ranging signal, wherein when the second transceiver is configured to operate in the receive mode, the second transceiver is configured to generate measurements of phase distortions of an interfering signal received by the second transceiver when the first transceiver transmits or receives the ranging signal;

receive the measurements of the interfering signal from the second transceiver when the second transceiver is configured to operate in the receive mode; and determine based on the measurements of the interfering signal whether the interfering signal comprises manipulations of the ranging signal by an intruding device.

\* \* \* \* \*